United States Patent [19]

Sugawara

[11] Patent Number: 5,781,349
[45] Date of Patent: Jul. 14, 1998

[54] ZOOM LENS

[75] Inventor: Saburo Sugawara, Kawasaki, Japan

[73] Assignee: Canon Kabushiki Kaisha, Tokyo, Japan

[21] Appl. No.: 509,933

[22] Filed: Aug. 1, 1995

[30] Foreign Application Priority Data

| Aug. 5, 1994 | [JP] | Japan | 6-204264 |
| Jul. 4, 1995 | [JP] | Japan | 7-191269 |

[51] Int. Cl.$^6$ .............................. G02B 15/14; G02B 3/02
[52] U.S. Cl. ........................ 359/691; 359/679; 359/708
[58] Field of Search ............................ 359/679, 691, 359/708, 690, 688, 687

[56] References Cited

U.S. PATENT DOCUMENTS

| 4,315,669 | 2/1982 | Fujii | 359/680 |
| 5,134,524 | 7/1992 | Hamano et al. | 359/687 |
| 5,179,473 | 1/1993 | Yano et al. | 359/691 |
| 5,247,393 | 9/1993 | Sugawara | 359/690 |
| 5,257,134 | 10/1993 | Sugawara | 359/679 |
| 5,303,088 | 4/1994 | Sugawara | 359/753 |
| 5,341,243 | 8/1994 | Okuyama et al. | 359/687 |
| 5,579,171 | 11/1996 | Suzuki et al. | 359/687 |

FOREIGN PATENT DOCUMENTS

| 4-1715 | 1/1992 | Japan | 359/679 |
| 5-27174 | 2/1993 | Japan | |

*Primary Examiner*—Georgia Y. Epps
*Assistant Examiner*—Jordan M. Schwartz
*Attorney, Agent, or Firm*—Fitzpatrick, Cella, Harper & Scinto

[57] ABSTRACT

A zoom lens is disclosed, comprising, in order from a screen, a first lens unit of negative refractive power including a first front lens sub-unit having at least one positive lens and at least one negative lens and, after a largest air separation in the first lens unit, a first rear lens sub-unit having at least one positive lens and at least one negative lens, and a second lens unit of positive refractive power including a second front lens sub-unit having at least one positive lens and at least one negative lens and, after a largest air separation in the second lens unit, a second rear lens sub-unit having at least one positive lens and at least one negative lens, zooming being performed by varying the separation between the first and second lens units.

8 Claims, 19 Drawing Sheets

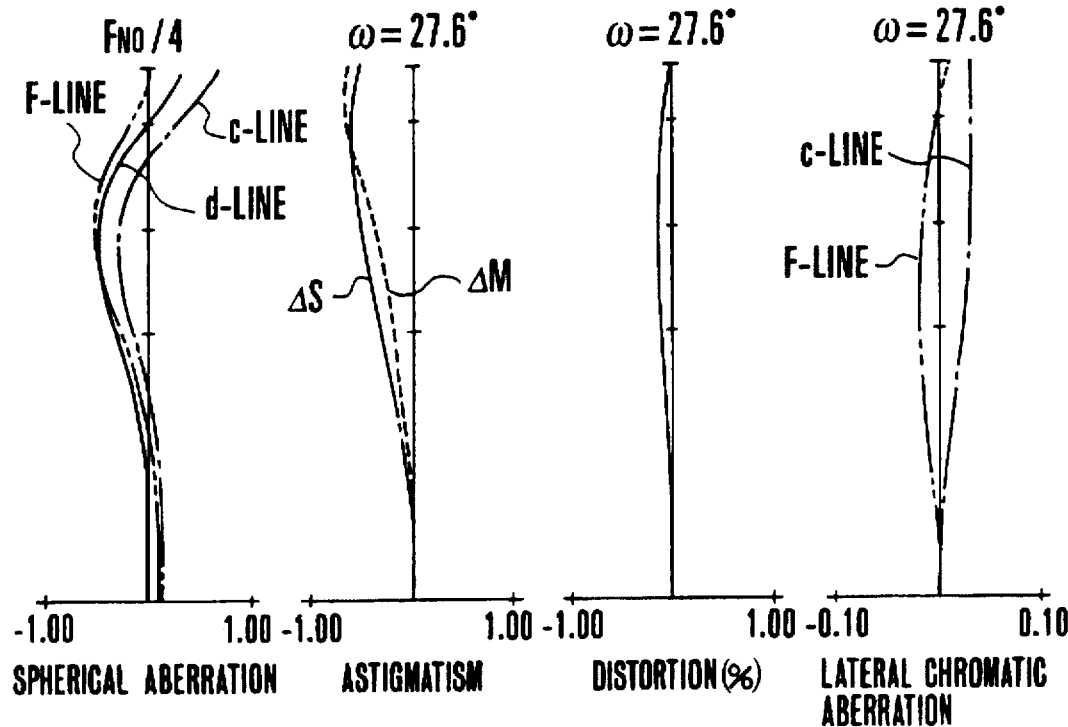
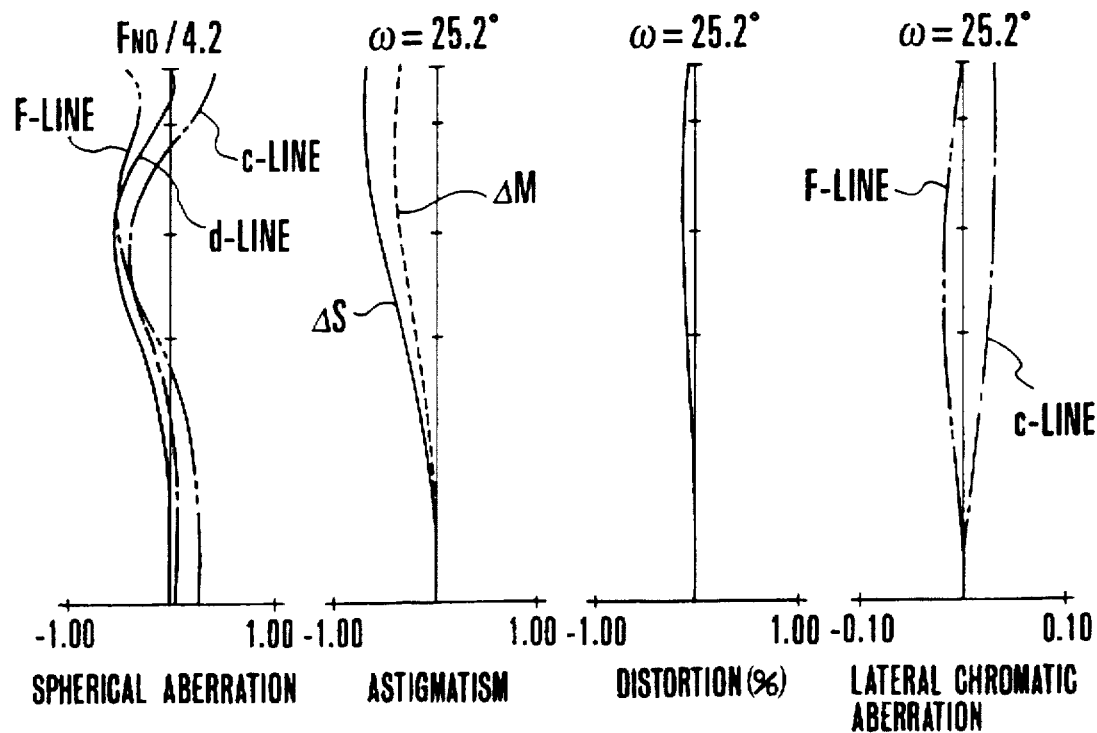

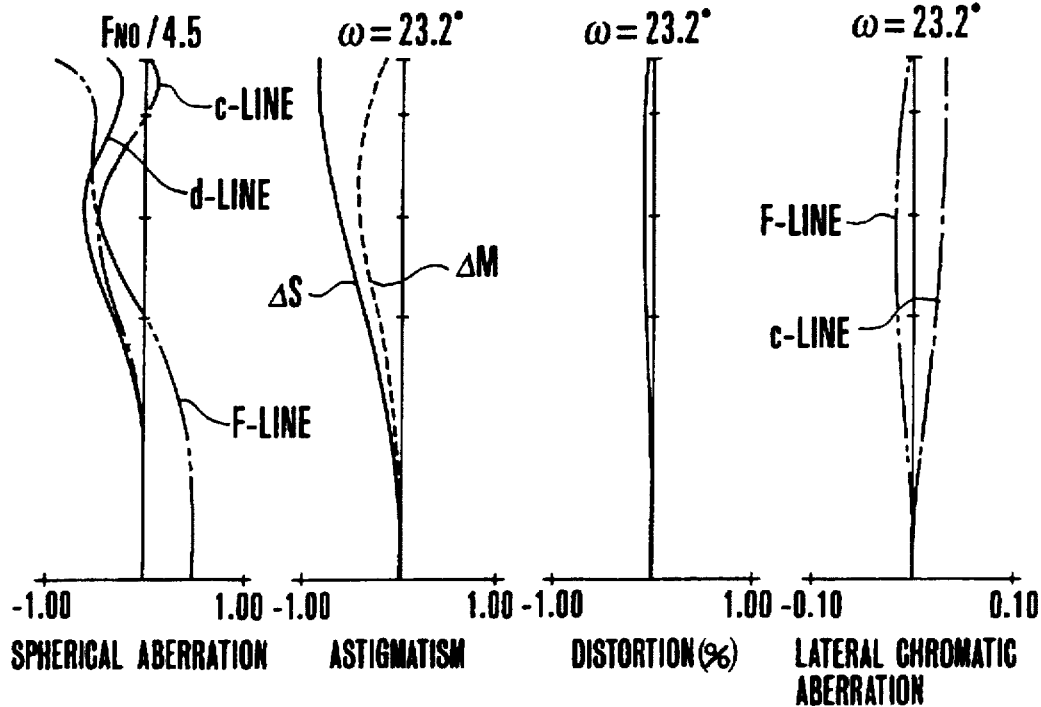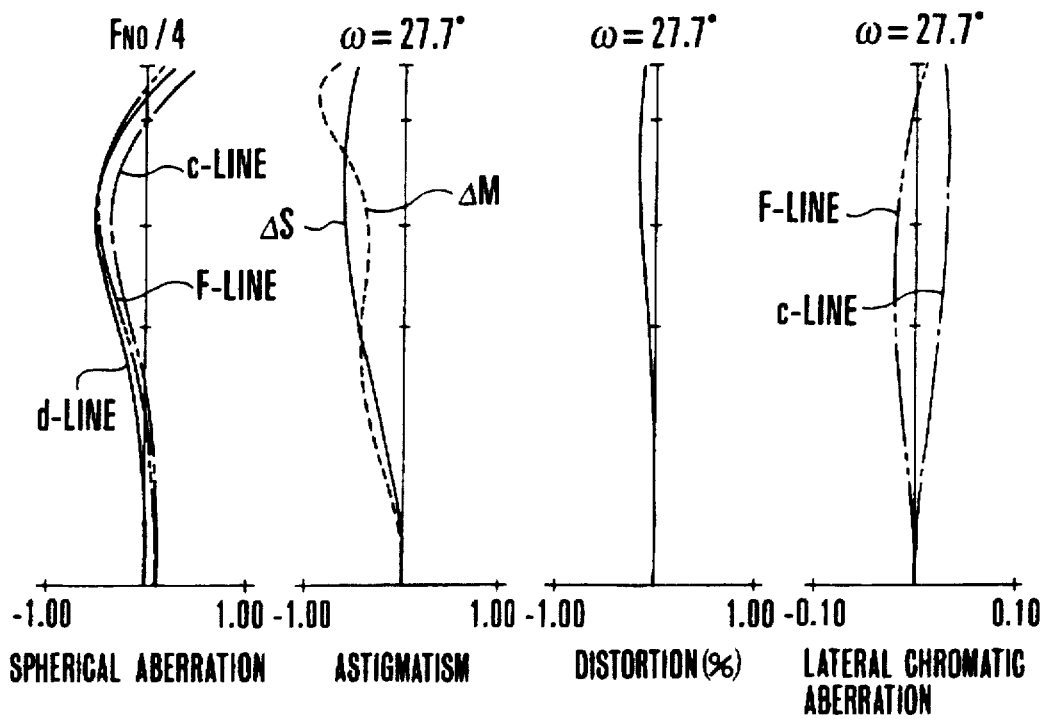

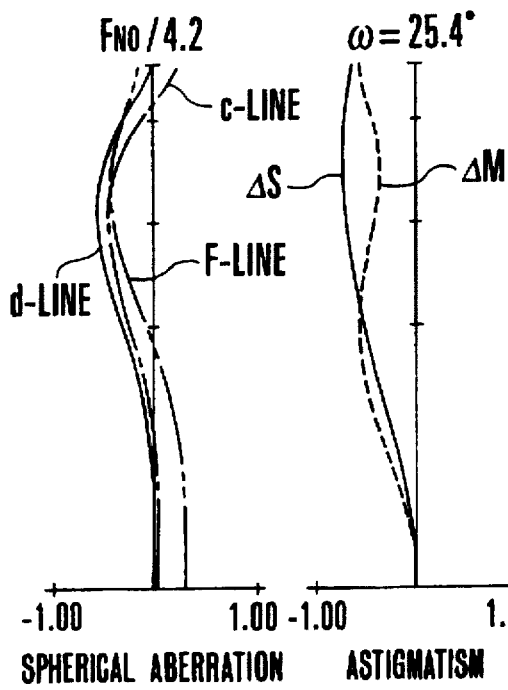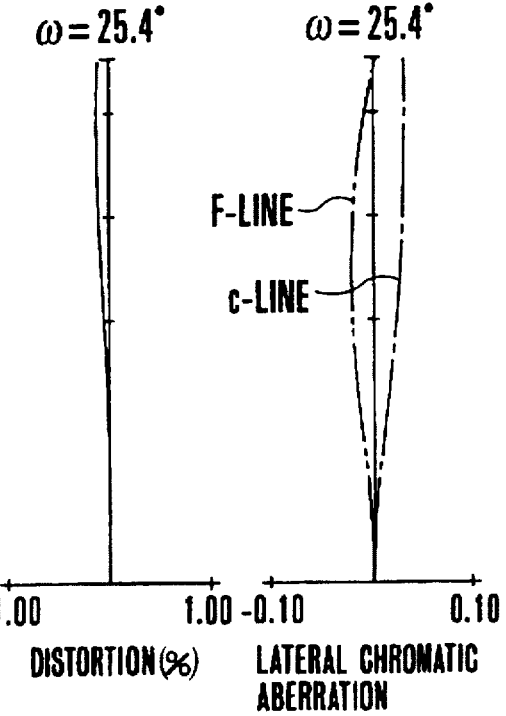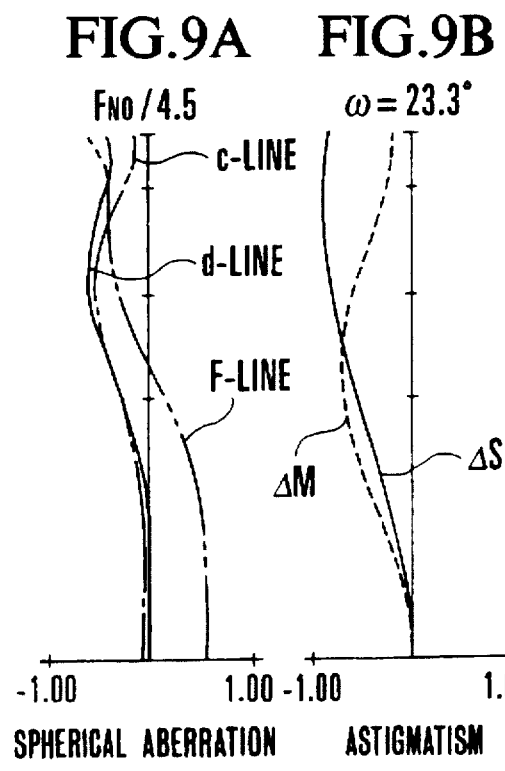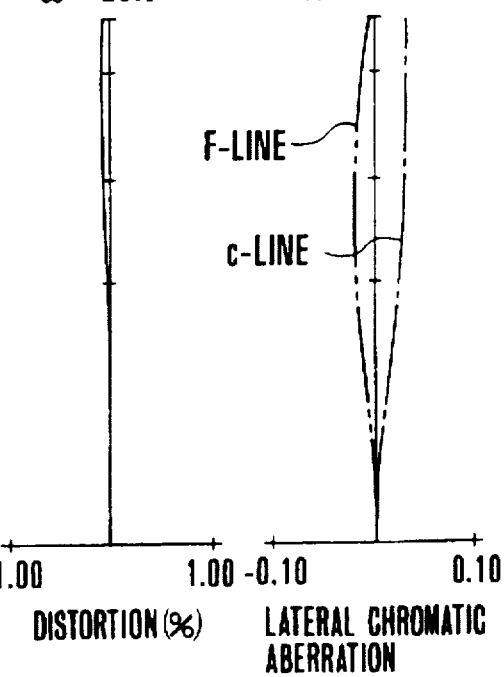

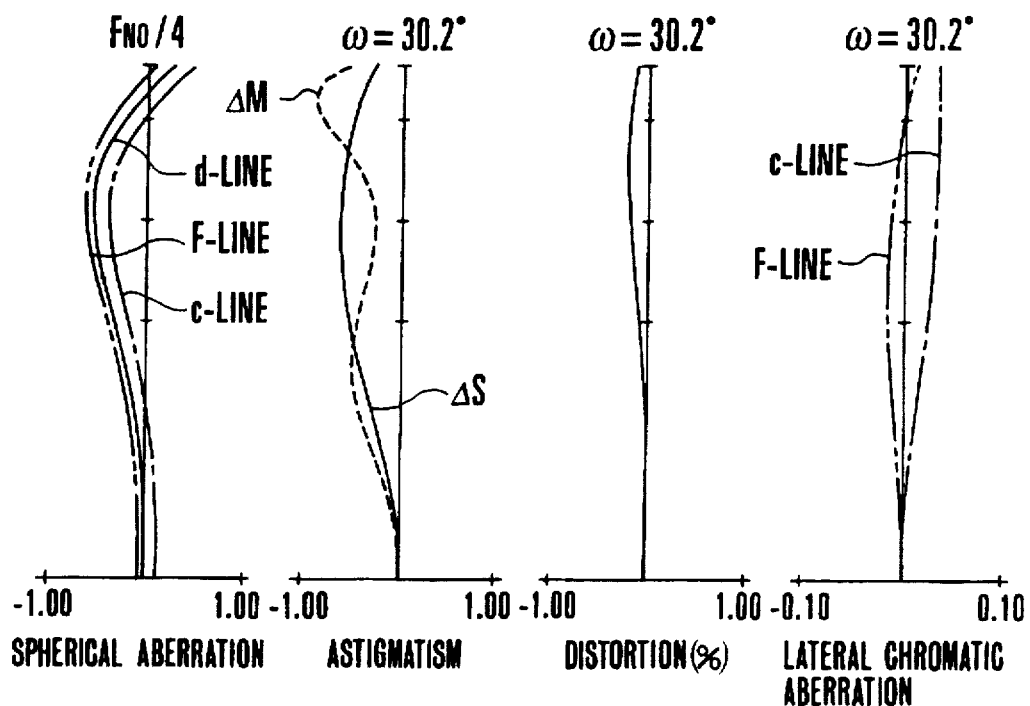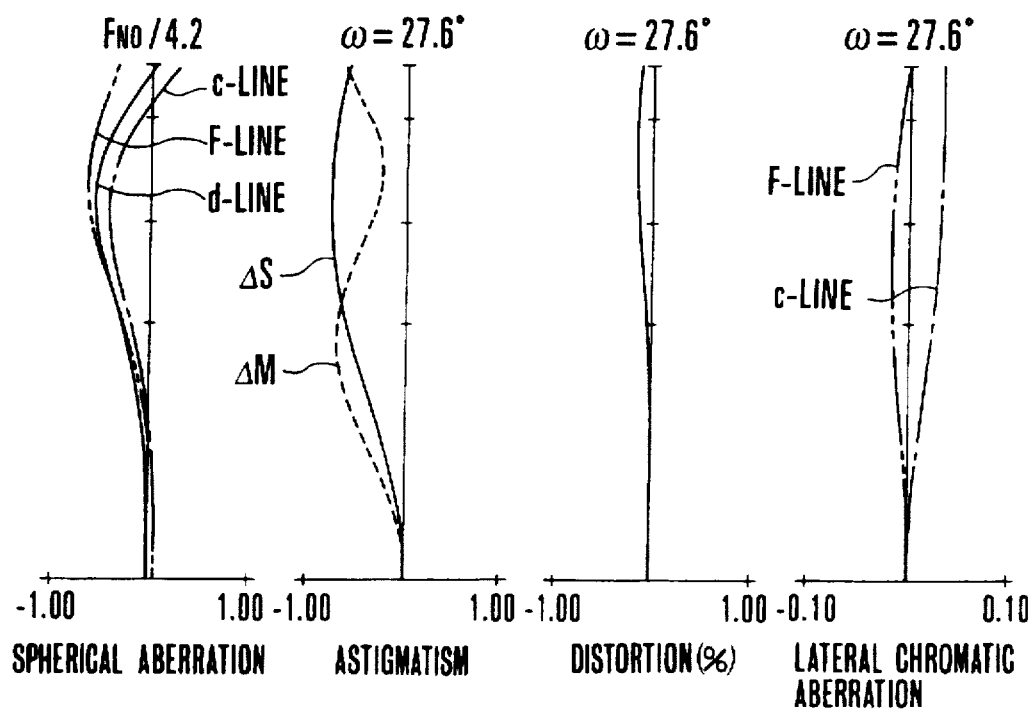

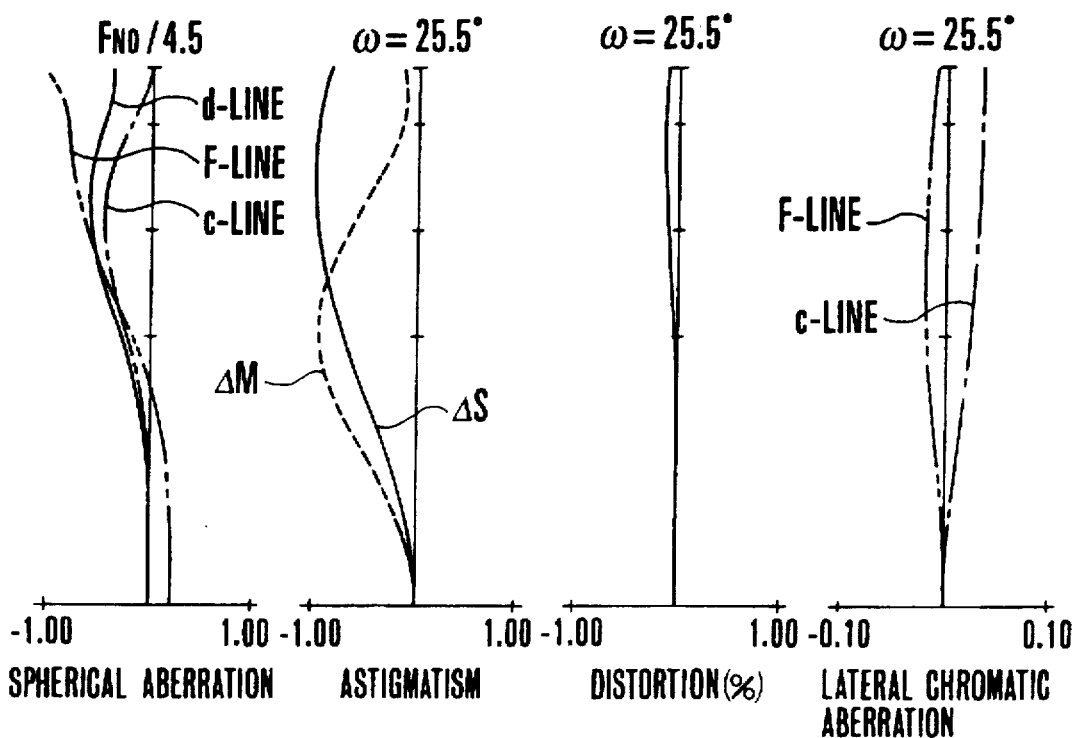

F I G. 13(A)
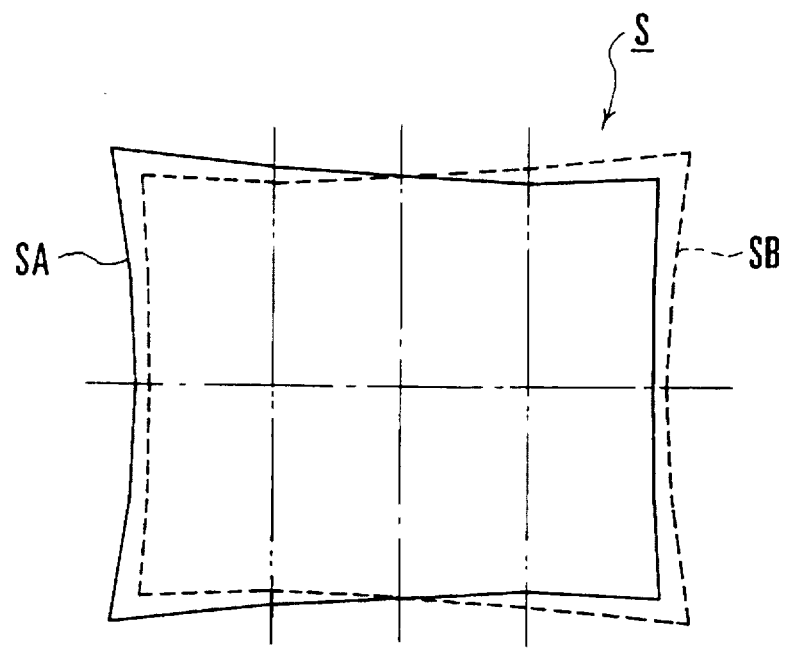
F I G. 13(B)
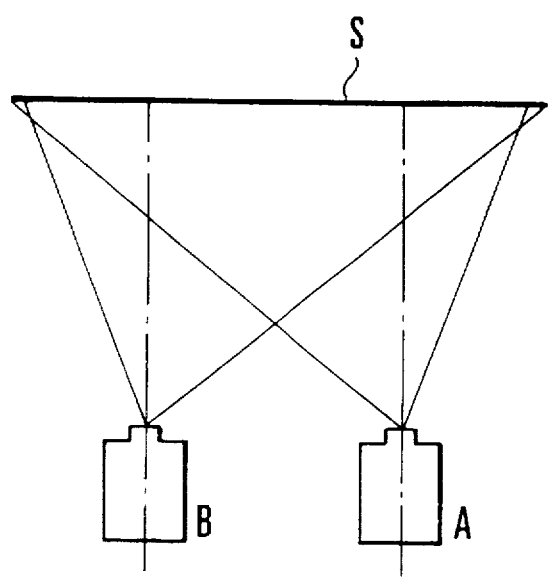

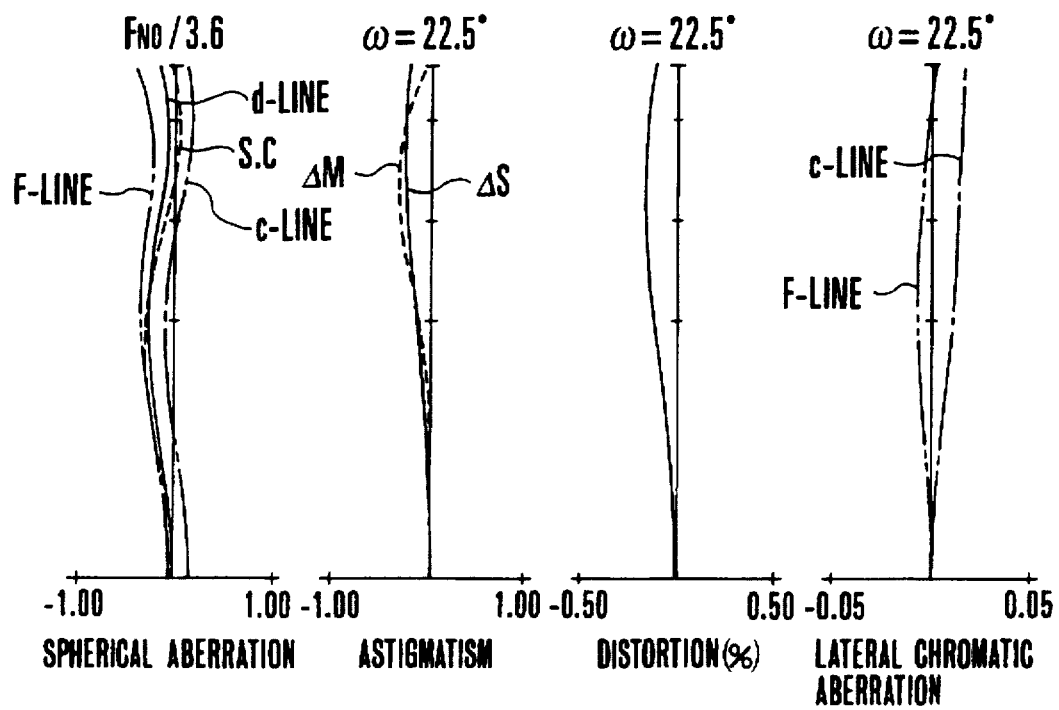
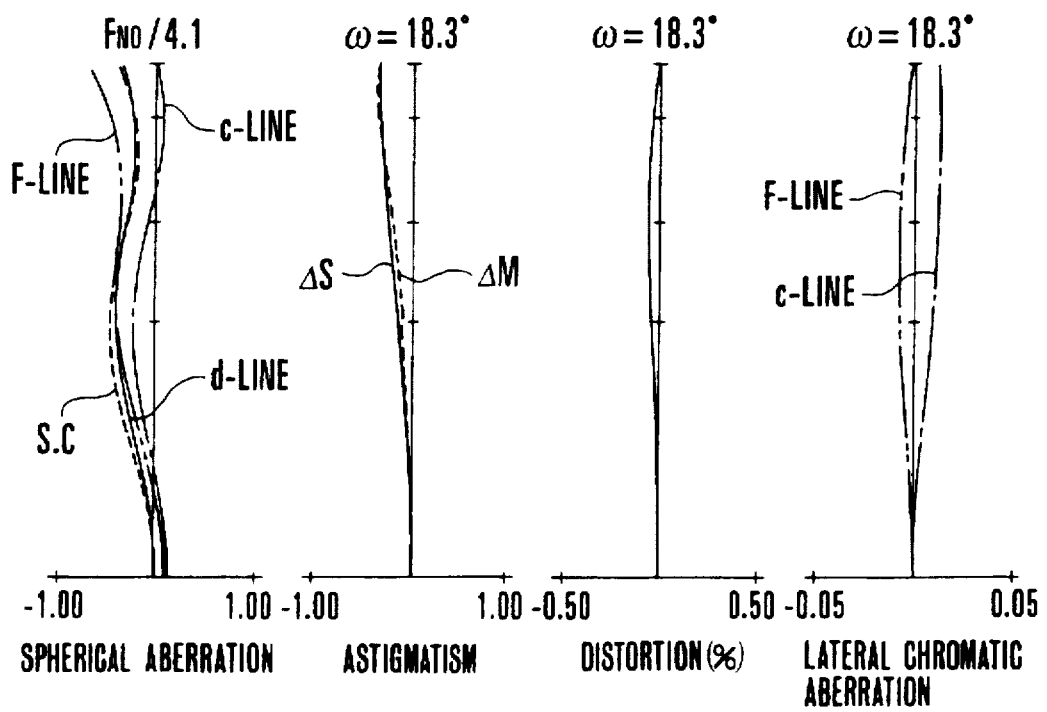

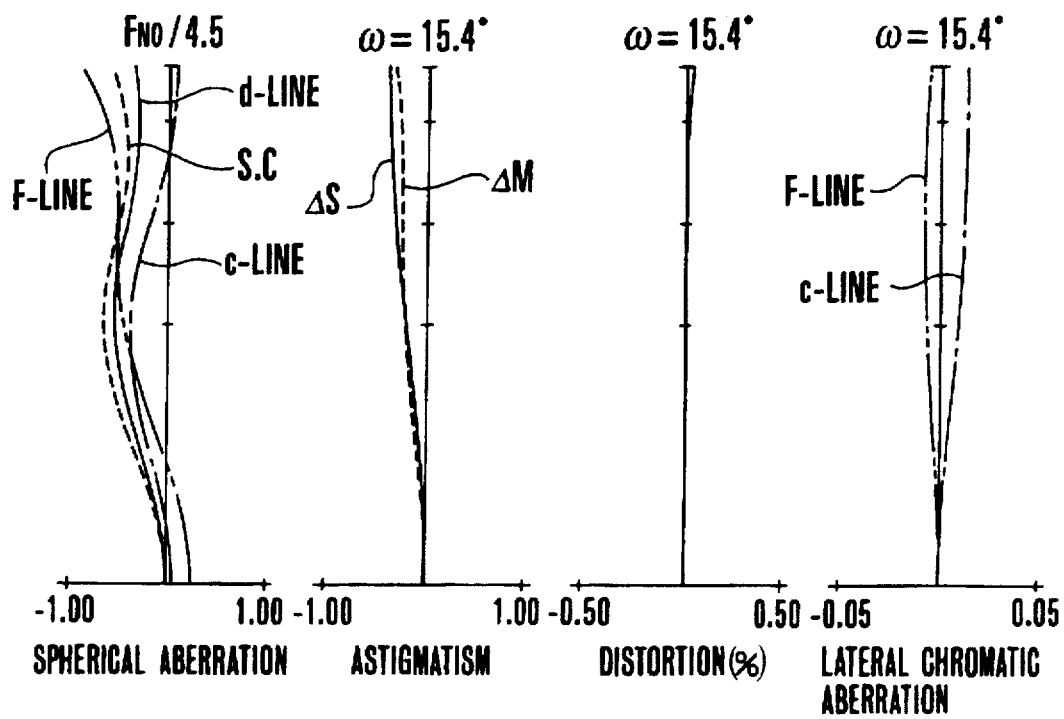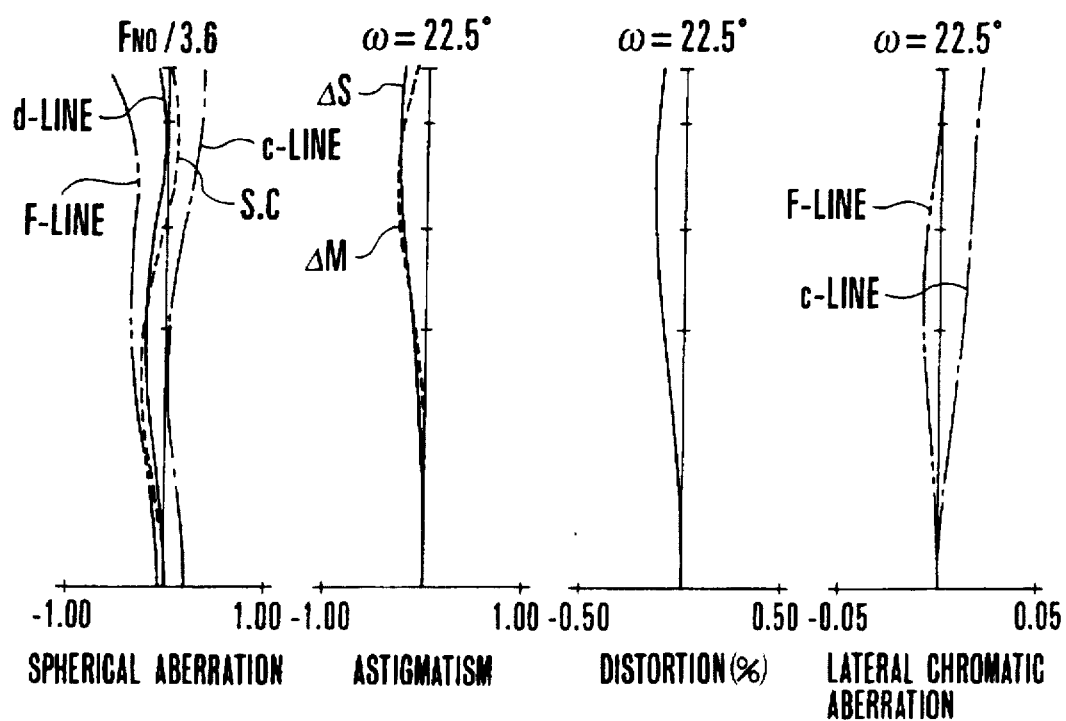

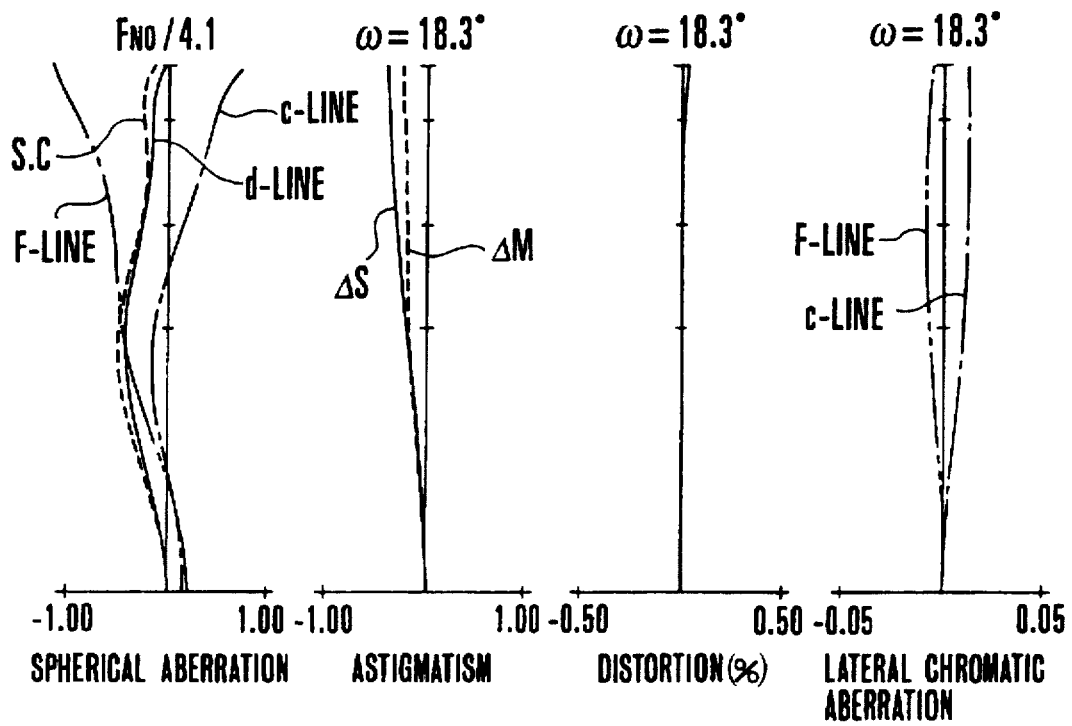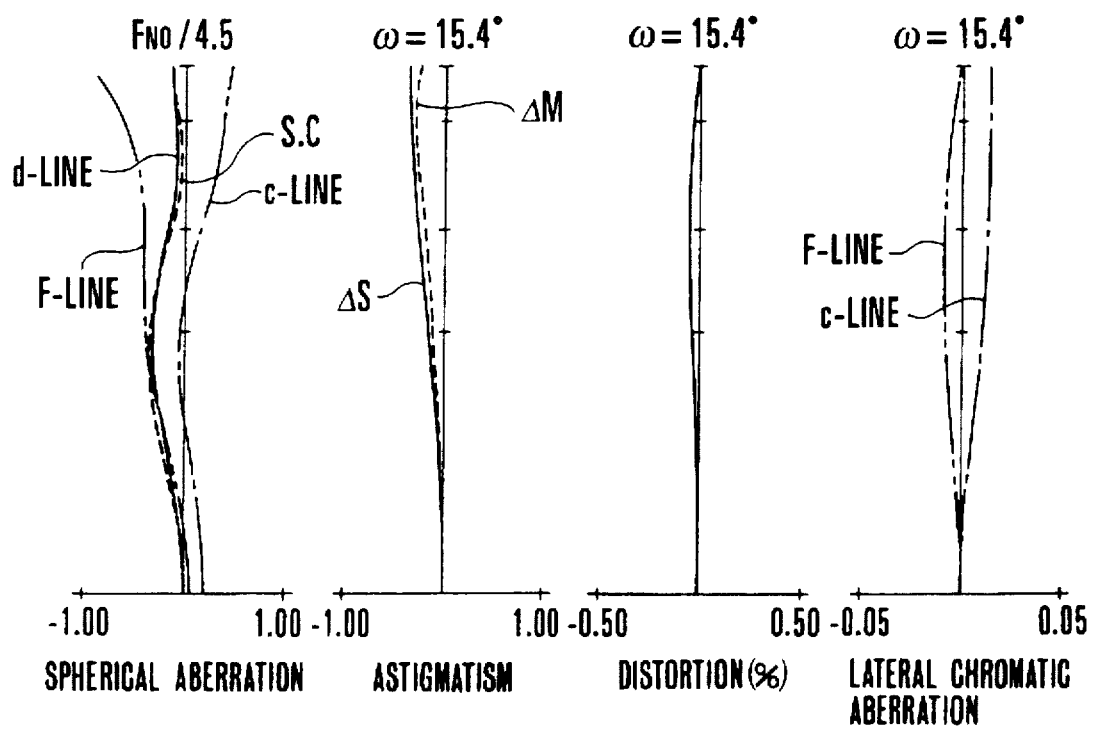

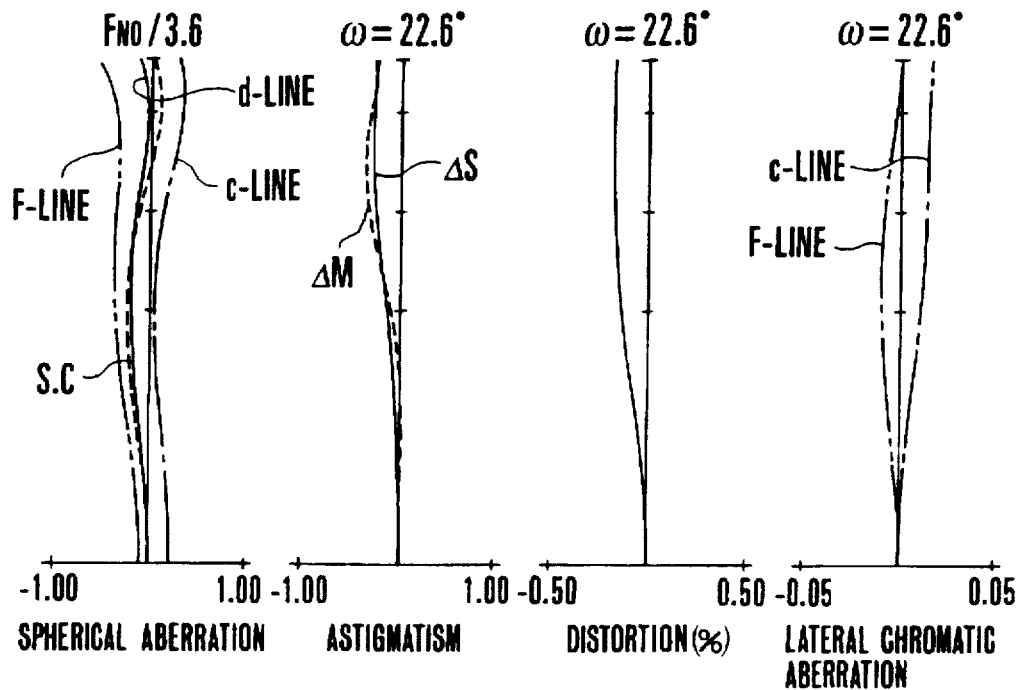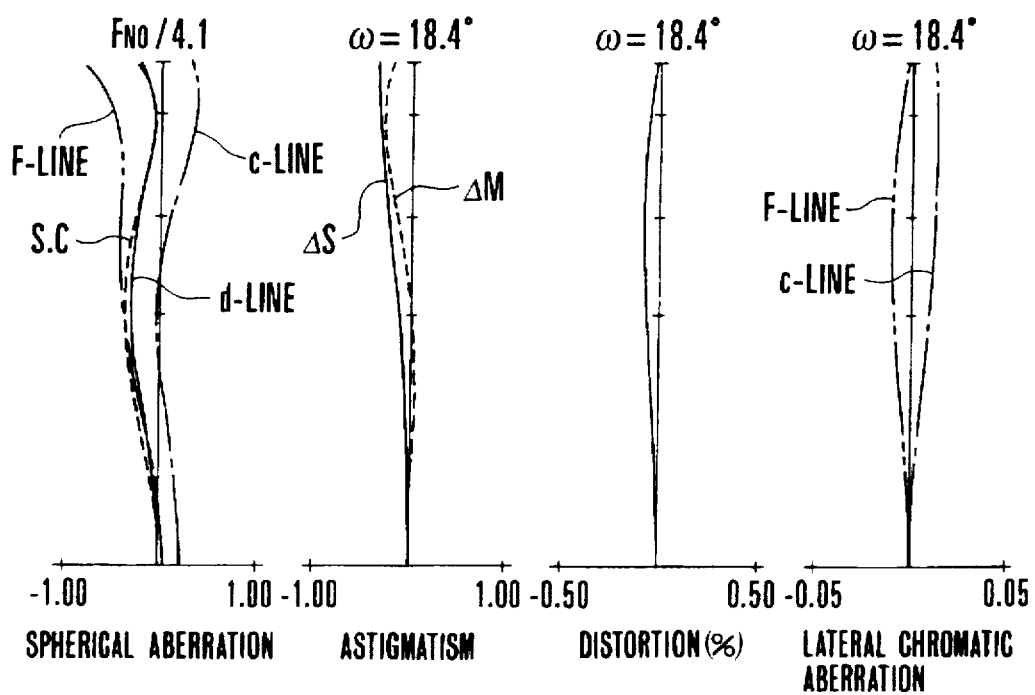

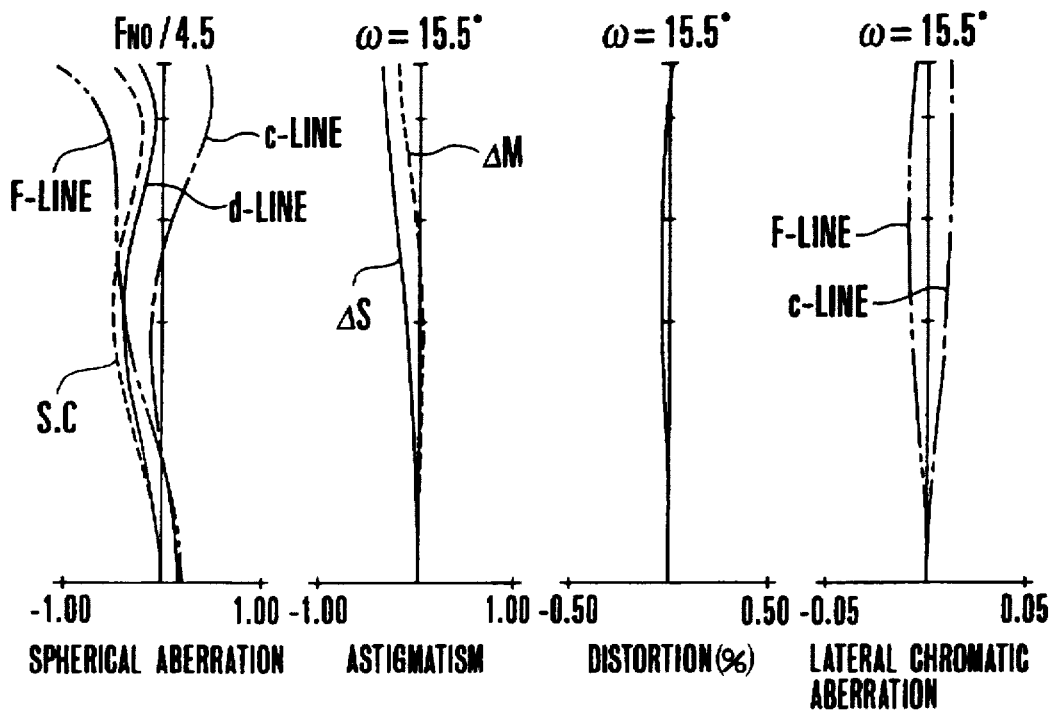
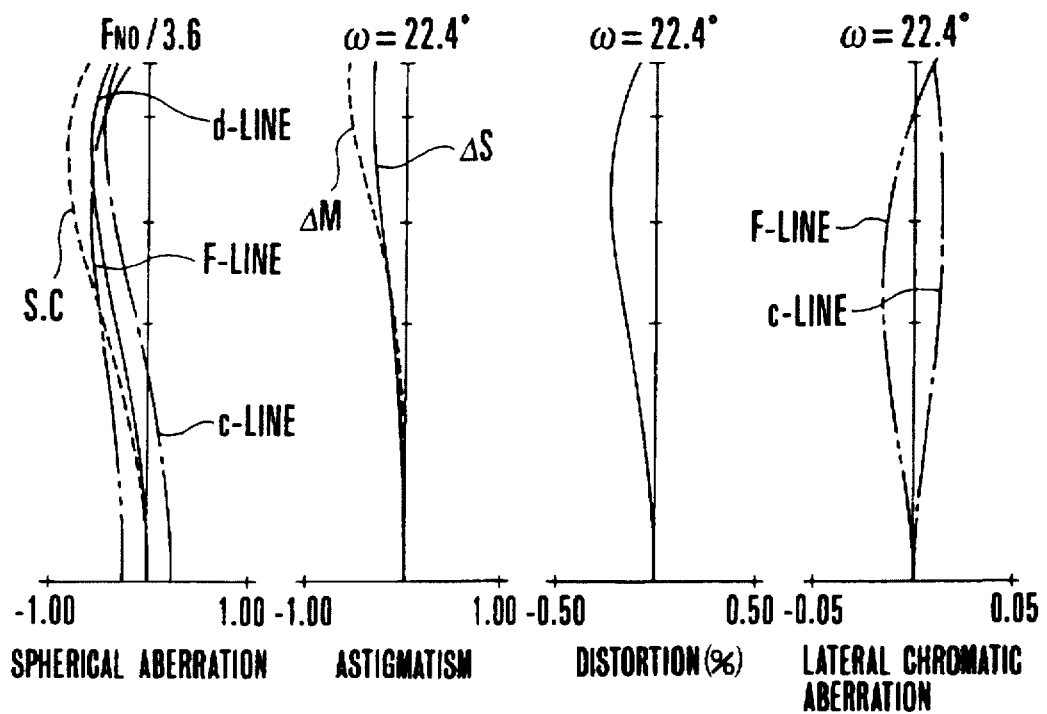

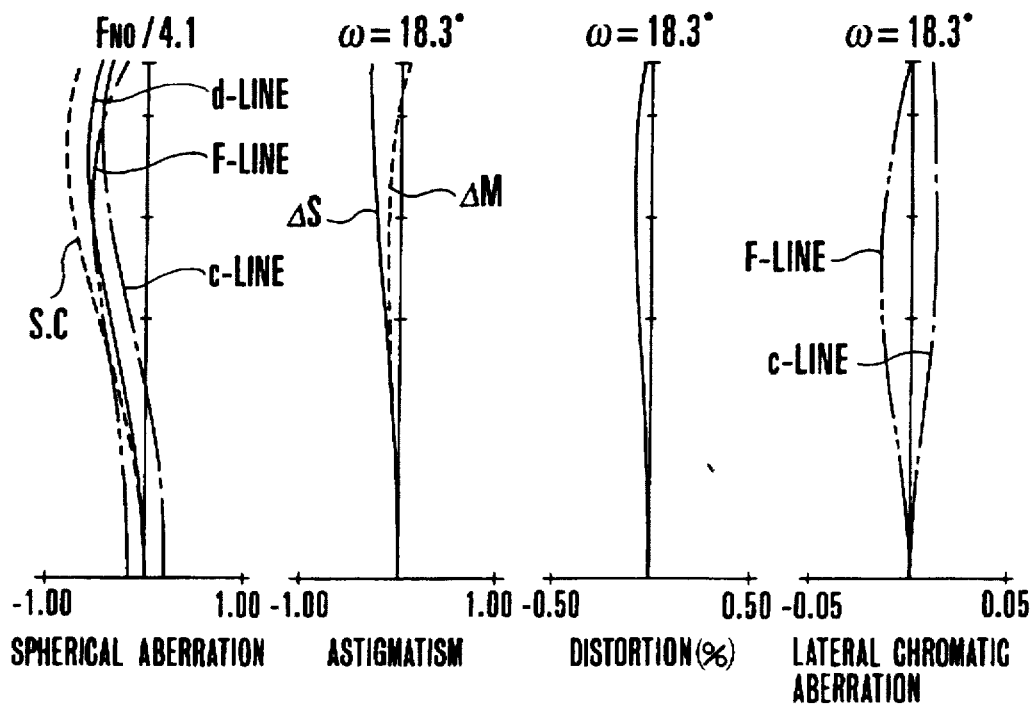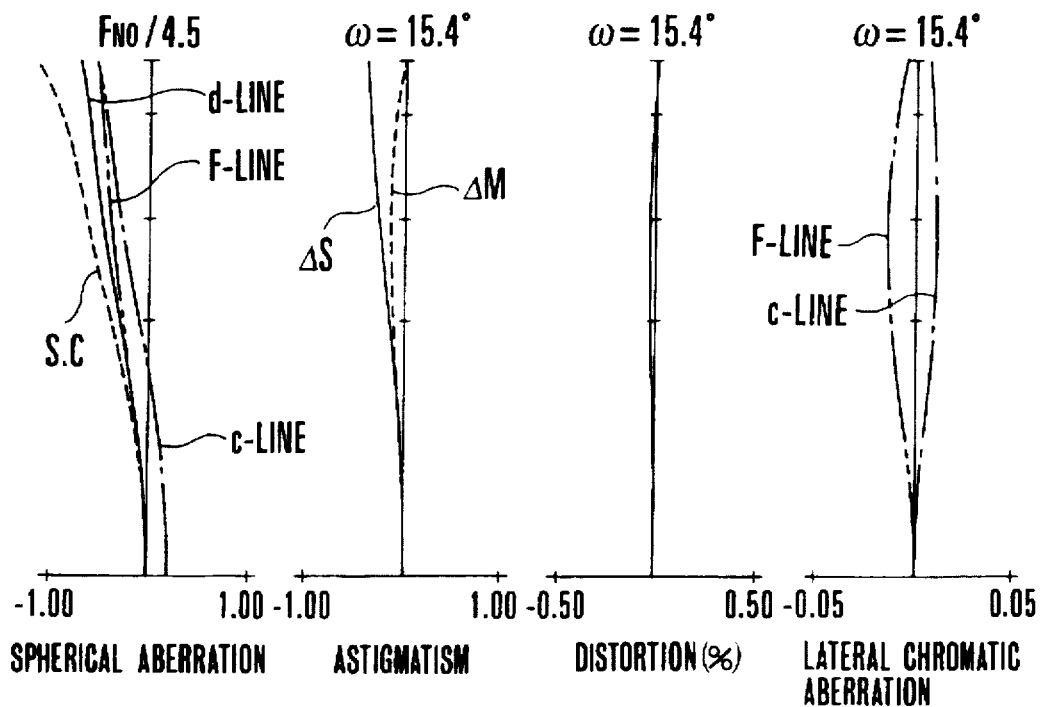

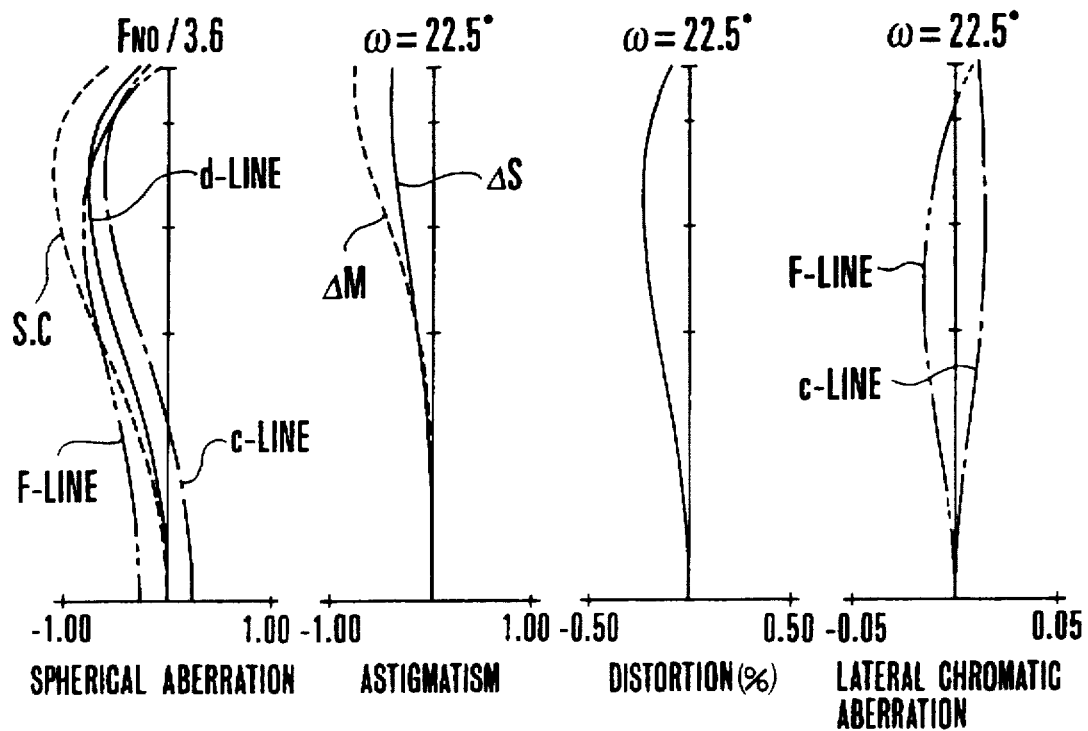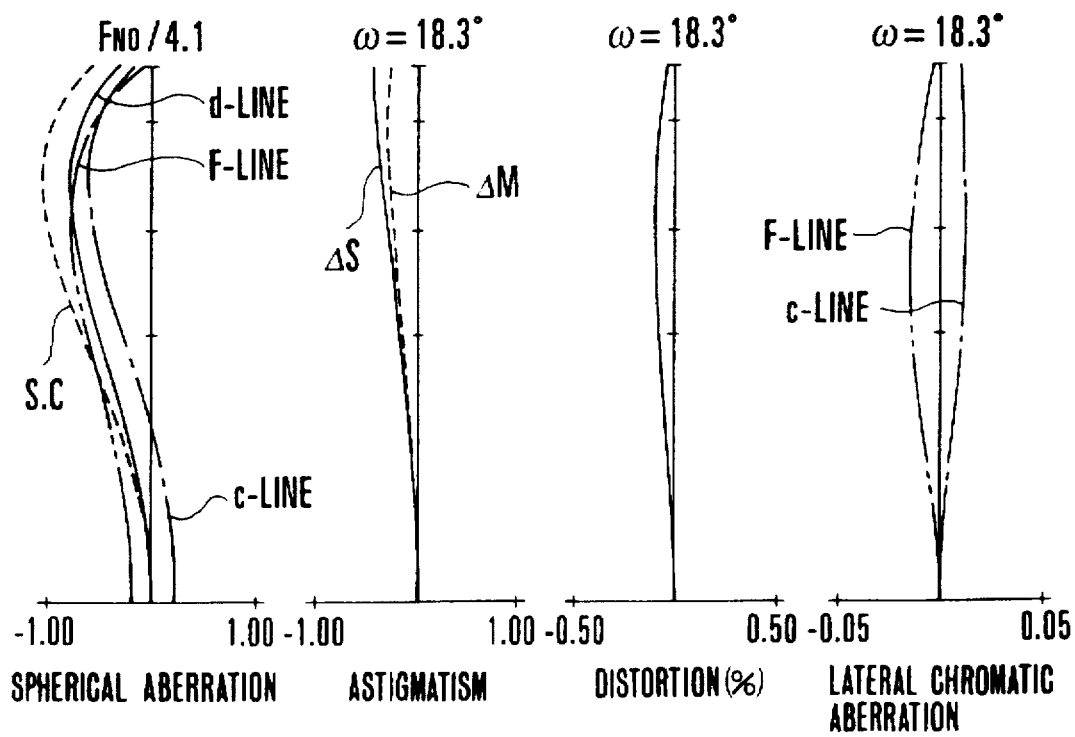

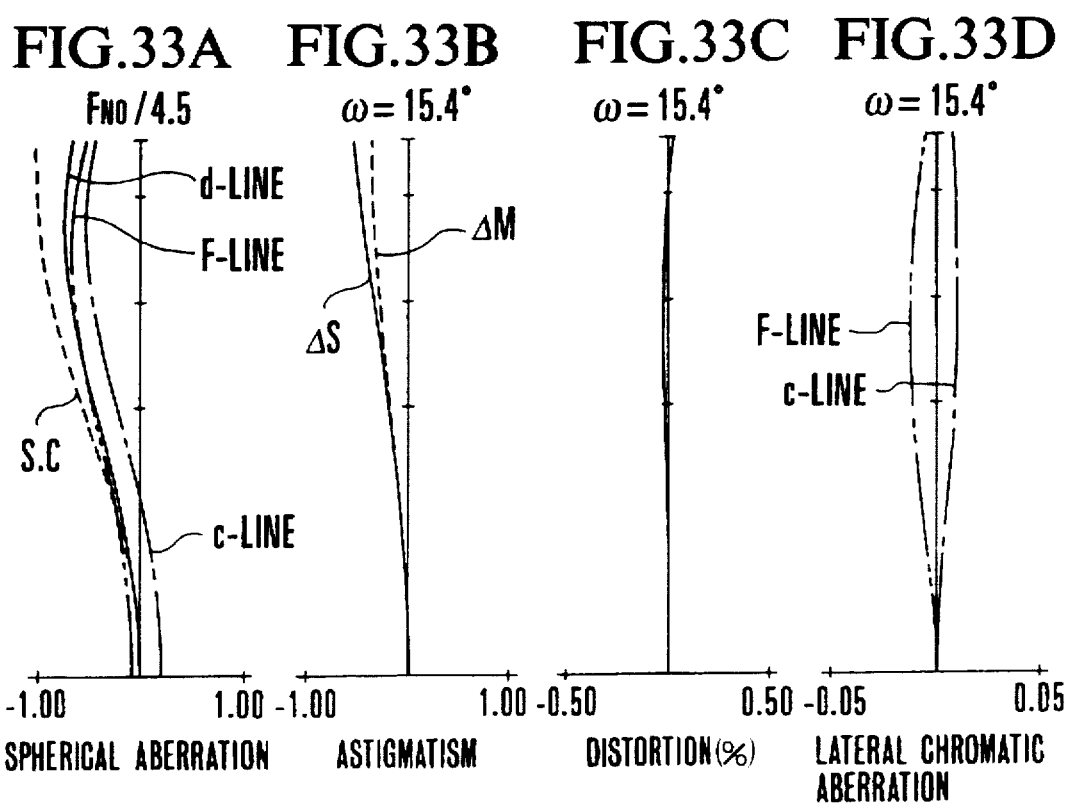

ZOOM LENS

BACKGROUND OF THE INVENTION

1. Field of the Invention

This invention relates to zoom lenses and, more particularly, to zoom lenses suitable to be used as, for example, the projection lens for television sets of the liquid crystal projection type in which images on the liquid crystal display element, or the color liquid crystal display elements, are projected onto a screen. Still more particularly, it relates to zoom lenses comprising two lens units in total.

2. Description of the Related Art

It is known to project an image in a liquid crystal display element, or images in a plurality of color liquid crystal display elements, onto a screen in superimposed relation. Such a liquid crystal projector has been proposed in many ways.

In general, for the projection lens to be used in the liquid crystal projection system, because optical members of various kinds such as reflection mirrors and dichroic mirrors must be put in a space between the last lens surface and the liquid crystal display element (or in the back focal distance), it is a prerequisite that the back focal distance is long enough. In addition, the projection lens has to have a high optical performance.

A prior known zoom lens for the liquid crystal projection system in, for example, Japanese Laid-Open Patent Application No. Hei 5-27174 comprises, in order from the long conjugate point, a positive first lens unit which axially moves only when focusing, a negative second lens unit for varying the focal length, a negative third lens unit for compensating for the image shift with zooming and a fixed positive fourth lens unit, totaling four lens units, and adapted to finite object distances.

In general, to project the liquid crystal display element at various magnifications of the projected image on the screen, the projection lens is formed to the wide-angle type of zoom lens with advantages of facilitating minimization of the size of the system as a whole and of providing convenient manipulation since the magnifying power for projection can be varied arbitrarily and easily and quickly. However, it is very difficult to correct all aberrations well enough throughout the entire zooming range to obtain a high optical performance.

The Japanese Laid-Open Patent Application No. Hei 5-27174 mentioned before proposes a zoom lens which varies distortion to large extent in a region of from the wide-angle end to a middle zooming position. For this reason, if, for example, as shown in FIGS. 13(A) and 13(B), two projectors A and B are used in such a way as to view the two projected images SA and SB in superimposed relation on the screen S in order to increase the brightness of the projected image, these images SA and SB come not to fit in the marginal zone. Thus, a problem arises in that the image quality is caused to deteriorate.

SUMMARY OF THE INVENTION

The present invention is to make up the entire system from two lens units and set forth proper rules of design for the construction and arrangement of the constituent lenses of each lens unit. It is, therefore, an object of the invention to widen the angle of image projection and at the same time to readily obtain a long back focal distance, while still permitting the variation of aberrations, particularly distortion, with zooming to be corrected well. Thus, good stability of optical performance is maintained throughout the entire zooming range.

Another object is to provide a zoom lens suited to be used in, for example, the liquid crystal projector.

The zoom lens of the invention comprises, in order from a first conjugate point of a longer distance (or from a screen), a first lens unit of negative refractive power and a second lens unit of positive refractive power. Zooming from the wide-angle end to the telephoto end is performed by axially moving the first and second lens units in such relation that the separation between the first and second lens units decreases monotonously. The first lens unit comprises, with a largest air separation as a boundary, a first front lens sub-unit and a first rear lens sub-unit. The second lens unit comprises, with a largest air separation as a boundary, a second front lens sub-unit and a second rear lens sub-unit. The first front lens sub-unit, the first rear lens sub-unit, the second front lens sub-unit and the second rear lens sub-unit each have at least one positive lens and at least one negative lens.

These and other objects and features will become apparent from the following description.

BRIEF DESCRIPTION OF THE DRAWINGS

FIGS. 4A, 4B, 4C, and 4D show graphic representations of the aberrations of the numerical example 1 of the invention in the wide-angle end.

FIGS. 5A, 5B, 5C, and 5D show graphic representations of the aberrations of the numerical example 1 of the invention in a middle focal length position.

FIGS. 6A, 6B, 6C, and 6D show graphic representations of the aberrations of the numerical example 1 of the invention in the telephoto end.

FIGS. 7A, 7B, 7C, and 7D show graphic representations of the aberrations of the numerical example 2 of the invention in the wide-angle end.

FIGS. 8A, 8B, 8C, and 8D show graphic representations of the aberrations of the numerical example 2 of the invention in a middle focal length position.

FIGS. 9A, 9B, 9C, and 9D show graphic representations of the aberrations of the numerical example 2 of the invention in the telephoto end.

FIGS. 10A, 10B, 10C, and 10D show graphic representations of the aberrations of the numerical example 3 of the invention in the wide-angle end.

FIGS. 11A, 11B, 11C, and 11D show graphic representations of the aberrations of the numerical example 3 of the invention in a middle focal length position.

FIGS. 12A, 12B, 12C, and 12D show graphic representations of the aberrations of the numerical example 3 of the invention in the telephoto end.

FIGS. 13(A) and 13(B) are respectively a plan view and a schematic top view to explain the discrepancy between the projected images when a pair of projection lenses have distortion.

FIGS. 19A, 19B, 19C, and 19D show graphic representations of the aberrations of the numerical example 4 of the invention in the wide-angle end.

FIGS. 20A, 20B, 20C, and 20D show graphic representations of the aberrations of the numerical example 4 of the invention in a middle focal length position.

FIGS. 21A, 21B, 21C, and 21D show graphic representations of the aberrations of the numerical example 4 of the invention in the telephoto end.

FIGS. 22A, 22B, 22C, and 22D show graphic representations of the aberrations of the numerical example 5 of the invention in the wide-angle end.

FIGS. 23A, 23B, 23C, and 23D show graphic representations of the aberrations of the numerical example 5 of the invention in a middle focal length position.

FIGS. 24A, 24B, 24C, and 24D show graphic representations of the aberrations of the numerical example 5 of the invention in the telephoto end.

FIGS. 25A, 25B, 25C and 25D show graphic representations of the aberrations of the numerical example 6 of the invention in the wide-angle end.

FIGS. 26A, 26B, 26C, and 26D show graphic representations of the aberrations of the numerical example 6 of the invention in a middle focal length position.

FIGS. 27A, 27B, 27C, and 27D show graphic representations of the aberrations of the numerical example 6 of the invention in the telephoto end.

FIGS. 28A, 28B, 28C, and 28D show graphic representations of the aberrations of the numerical example 7 of the invention in the wide-angle end.

FIGS. 29A, 29B, 29C, and 29D show graphic representations of the aberrations of the numerical example 7 of the invention in a middle focal length position.

FIGS. 30A, 30B, 30C, and 30D show graphic representations of the aberrations of the numerical example 7 of the invention in the telephoto end.

FIGS. 31A, 31B, 31C, and 31D show graphic representations of the aberrations of the numerical example 8 of the invention in the wide-angle end.

FIGS. 32A, 32B, 32C, and 32D show graphic representations of the aberrations of the numerical example 8 of the invention in a middle focal length position.

FIGS. 33A, 33B, 33C, and 33D show graphic representations of the aberrations of the numerical example 8 of the invention in the telephoto end.

In the aberration curves, ΔS stands for the sagittal image focus; ΔM for the meridional image focus; c for the spectral c-line; d for the spectral d-line; F for the spectral F-line; and S.C. for the Sine Condition.

DETAILED DESCRIPTION OF THE PREFERRED EMBODIMENTS

Figure 1:
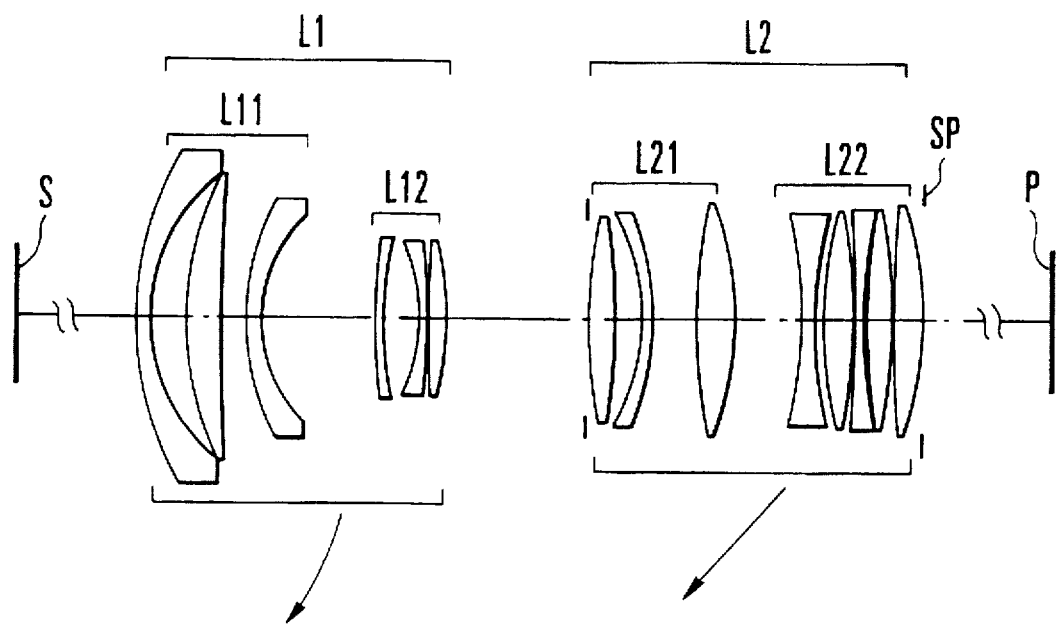
FIG. 1 is a lens block diagram of a numerical example 1 of the invention.
Figure 2:
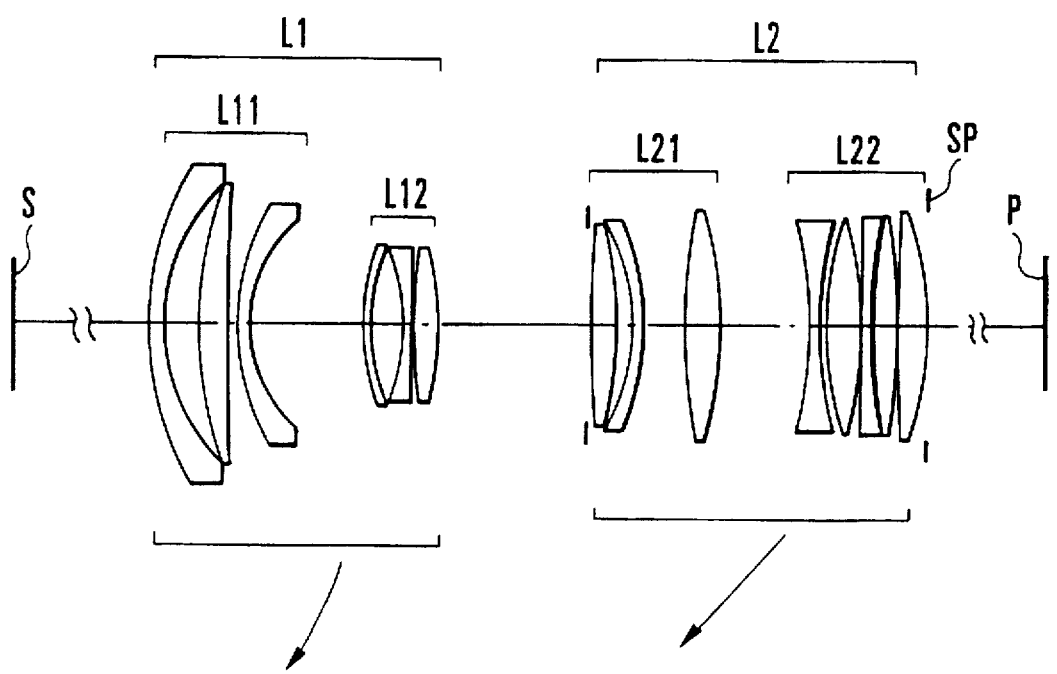
FIG. 2 is a lens block diagram of a numerical example 2 of the invention.
Figure 3:
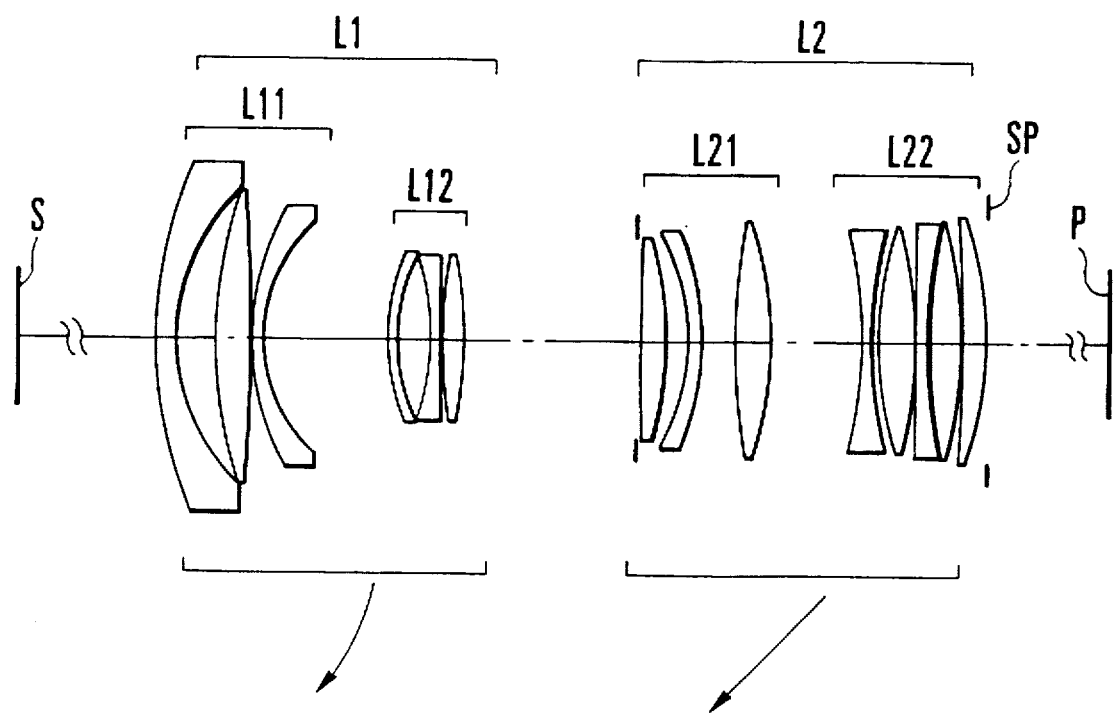
FIG. 3 is a lens block diagram of a numerical example 3 of the invention.

FIG. 1, FIG. 2 and FIG. 3 in block diagrams show the numerical examples 1, 2 and 3 of zoom lenses of the invention in the wide-angle end, respectively, to be described later. FIGS. 4A, 4B, 4C, and 4D, FIGS. 5A, 5B, 5C, and 5D, and FIGS. 6A, 6B, 6C and 6D show the aberrations of the numerical example 1 of the invention in the wide-angle end, a middle focal length position and the telephoto end, respectively. FIGS. 7A, 7B, 7C, and 7D, FIGS. 8A, 8B, 8C, and 8D.

FIGS. 9A, 9B, 9C, and 9D show the aberrations of the numerical example 2 of the invention in the wide-angle end, a middle focal length position and the telephoto end, respectively. FIGS. 10A, 10B, 10C, and 10D FIGS. 11A, 11B, 11C, and 11D and FIGS. 12A, 12B, 12C, and 12D show the aberrations of the numerical example 3 of the invention in the wide-angle end, a middle focal length position and the telephoto end, respectively.

In the lens block diagrams of FIG. 1, FIG. 2 and FIG. 3, reference character L1 denotes a first lens unit of negative refractive power and reference character L2 denotes a second lens unit of positive refractive power. The first lens unit L1 comprises, with the widest of the air separations (between the lens members) as a boundary, two lens sub-units, namely, a first front lens sub-unit L11 and a first rear lens sub-unit L12. The second lens unit L2 comprises, with the widest of the air separations (between the lens members) as a boundary, two lens sub-units, namely, a second front lens sub-unit L21 and a second rear lens sub-unit L22. Reference character S denotes a screen (projection plane), and reference character P denotes a liquid crystal display element, color liquid crystal display element or like original image (plane to be projected).

The screen S and the original image P are in conjugate relationship. As usual, the screen S corresponds to the conjugate point of a longer distance (first conjugate point), and the original image P corresponds to the conjugate point of a shorter distance (second conjugate point). To effect zooming from the wide-angle end to the telephoto end, as shown by the arrows, the first lens unit L1 moves axially toward the screen S non-linearly, while the second lens unit L2 moves axially toward the screen S, in such relation that the separation between both the lens units L1 and L2 decreases monotonously.

In the present embodiment, either the front or the rear lens sub-unit is constructed with inclusion of at least one positive lens and at least one negative lens. This leads to simultaneously fulfill the requirements of securing the back focal distance to a predetermined value and of assuring good correction of all aberrations throughout the entire zooming range.

In particular, the first front lens sub-unit L11 is chosen to have at least one positive lens and at least one negative lens. With this, the distortion of the pincushion type the negative lens produces is corrected by the positive lens. Also, the first rear, the second front and the second rear lens sub-units each are constructed with at least one positive lens and at least one negative lens to thereby correct lateral chromatic aberration, spherical aberration and coma and further astigmatism in good balance.

The above-described features or conditions suffice for achieving realization of a zoom lens at which the invention aims. To further improve the stability of optical performance against zooming over the entire area of the image frame, it is even recommended to satisfy at least one of the following features or conditions:

(1-1) The first front lens sub-unit and the second rear lens sub-unit each have an aspheric surface of such shape that the positive or negative refractive power gets progressively weaker as going from the center of the lens to the margin.

With this, it results that the aspheric sphere is applied to the one of the lens surfaces on which the height of incidence "ha" of the principal ray of the off-axial light beam is high enough to effectively correct distortion throughout the entire zooming range.

(1-2) For the positive lens in the first front lens sub-unit, letting the radii of curvature of that lens surface which faces the first conjugate point of a longer distance and of that lens surface which faces the second conjugate point of a shorter distance be denoted by $R11_{PF}$ and $R11_{PR}$, respectively, and putting $$SF=(R11_{PR}+R11_{PF})/(R11_{PR}-R11_{PF})$$

it satisfies the following condition:

$$0.2<SF<2.5 \quad (1)$$

The inequalities of condition (1) regulate the shape of the positive lens included in the first front lens sub-unit. In a range beyond the lower limit of the condition (1), not only is primary distortion over-corrected, but also higher order distortions are produced extremely, which would be difficult to correct even if the aspheric surface is used. Also, in a range beyond the upper limit of the condition (1), distortion is under-corrected objectionably. It should be pointed out here that when the first front lens sub-unit is constructed, as shown in FIGS. 1 to 3, from a negative lens, a positive lens and a negative lens, it is desired to satisfy this condition.

To further improve the distortion, it is better to alter the numerical limits of the condition (1) as follows:

$$0.4<SF<2 \quad (1a)$$

(1-3) Notice that the choice of the following conditions to satisfy is common in all the embodiments.

$$1.2<bfw/fw \quad (2)$$

$$0.3<-f1/f2<1.5 \quad (3)$$

$$0.3<-f1/fw<2 \quad (4)$$

$$0.5<f2/fw<1.8 \quad (5)$$

$$0.3<ew/fw<2 \quad (6)$$

where bfw is the distance from the last lens surface of the second lens unit to the second conjugate point of a shorter distance in the wide-angle end when the first conjugate point is at infinity, fw is the shortest focal length of the entire system, f1 and f2 are the focal lengths of the first and second lens units, respectively, and ew is the interval between the principal points of the first and second lens units in the wide-angle end.

The inequality of condition (2) gives a range for the ratio of the back focal distance for the wide-angle end (shortest focal length position) and the shortest focal length of the entire system. In a range beyond the lower limit of the condition (2), the back focal distance gets too short to create a space which is to be occupied by dichroic mirrors for combining the three images of different original colors that are formed by the respective liquid crystal display elements. So, it is no good.

The inequalities of condition (3) give a range for the ratio of the focal lengths of the first and second lens units. In a range beyond the lower limit of the condition (3), the refractive power of the first lens unit gets too strong. Therefore, over-correction of field curvature and under-correction of distortion come to result. In a range beyond the upper limit of the condition (3), the focal length of the first lens unit gets too long, which in turn causes a great increase of the focal length of the entire system. For a projected image of large magnification to be obtained, therefore, the projecting distance has to increase greatly. So, it is no good.

The inequalities of condition (4) give a range for the ratio of the focal length of the first lens unit to the shortest focal length of the entire system. In a range beyond the lower limit of the condition (4), over-correction of field curvature results. In a range beyond the upper limit of the condition (4), under-correction of field curvature results. So it is no good.

The inequalities of condition (5) give a range for the ratio of the focal length of the second lens unit to the shortest focal length of the entire system. In a range beyond the lower limit of the condition (5), the second lens unit gets too short a focal length. Therefore, the back focal distance becomes short objectionably. In a range beyond the upper limit of the condition (5), the second lens unit gets too long a focal length. Therefore, the total length of the lens system becomes large objectionably.

The inequalities of condition (6) give a range for the ratio of the principal point interval between the first and second lens units to the shortest focal length of the entire system. In a range beyond the lower limit of the condition (6), the zoom ratio cannot be taken high enough. In a range beyond the upper limit of the condition (6), the total length of the complete lens becomes large objectionably.

It is to be noted in connection with the invention that, from the point of view of aberration correction, it is more preferred to set forth the numerical limits for the inequalities of conditions (2) to (6) as follows:

$$1.6<bfw/fw \quad (2a)$$

$$0.45<-f1/f2<1.0 \quad (3a)$$

$$0.5<-f1/fw<2 \quad (4a)$$

$$0.7<f2/fw<1.6 \quad (5a)$$

$$0.7<ew/fw<1.8 \quad (6a)$$

(1-4) In the zoom lenses shown in FIG. 1 to FIG. 3, the first front lens sub-unit L11 comprises, in order from the first conjugate point, a negative lens L111 of meniscus form convex toward the first conjugate point, a positive lens L112 having a convex surface of strong refracting power facing the first conjugate point and a negative lens L113 of meniscus form convex toward the first conjugate point, thereby well correcting distortion throughout the entire zooming range. If the first front lens sub-unit is otherwise constructed, for example, with positive, negative and negative lenses in this order from the first conjugate point, the lens diameter would get larger, and if with negative, negative and positive lenses, correction of distortion would become insufficient.

The first rear lens sub-unit L12 comprises a negative lens of meniscus form convex toward the first conjugate point, a negative lens having a surface of strong refracting power facing the first conjugate point and a positive lens, thereby minimizing the size of the lens system, while still permitting lateral chromatic aberration to be corrected well. Achromatism is made where the off-axial principal ray is incident on the first lens unit at low heights "ha". So, the lateral chromatic aberrations of higher order are produced to a small amount. The lateral chromatic aberration is thus well corrected as a whole.

The second front lens sub-unit L21 comprises a positive lens of bi-convex form, a negative lens of meniscus form convex toward the second conjugate point and a positive lens of bi-convex form, thereby correcting spherical aberration and longitudinal chromatic aberration in good balance.

The second rear lens sub-unit L22 comprises a negative lens of bi-concave form, a positive lens of bi-convex form, a negative lens having a concave surface of strong refracting power facing the second conjugate point, a positive lens of bi-convex form and a positive lens having a convex surface of strong refracting power facing the second conjugate point, thereby well correcting all aberrations, particularly coma, over the entire area of the image frame. The term "strong refracting power facing the first conjugate point" herein used means that it is compared with the refracting power of the lens surface that faces the second conjugate point. The conversion of this is also the same.

(1-5) When the distance from the first front lens sub-unit L11 to the first conjugate point varies to shorter ones, the air separation between the positive lens L112 and the negative lens L113 is shortened by corresponding amounts. In such a manner, the movement of the first lens unit toward the first conjugate point is controlled. As the zoom lens of the invention is used for the projector, when this feature is satisfied, the variation of field curvature with variation of the projecting distance is corrected well.

Further, from the point of the correction of chromatic aberrations, it is preferred to satisfy the following conditions:

$$-15 < \nu 11n - \nu 11p < 15 \qquad (7)$$

$$15 < \nu 12n - \nu 12p < 40 \qquad (8)$$

where $\nu 11n$: the mean value of the Abbe numbers of the negative lenses in the first front lens sub-unit;

$\nu 11p$: the mean value of the Abbe numbers of the positive lenses in the first front lens sub-unit;

$\nu 12n$: the mean value of the Abbe numbers of the negative lenses in the first rear lens sub-unit; and $\nu 12p$: the mean value of the Abbe numbers of the positive lenses in the first rear lens sub-unit.

The inequalities of conditions (7) and (8) are for good correction of lateral chromatic aberration. In a range beyond the lower limit of the condition (7), under-correction of lateral chromatic aberration results. In a range beyond the upper limit of the condition (7), achromatism is effected where the off-axial principal ray is incident on the first lens unit at high heights "ha". Therefore, lateral chromatic aberrations of higher order are produced. So, it is no good. In a range beyond the lower limit of the condition (8), under-correction of lateral chromatic aberration results. In a range beyond the upper limit of the condition (8), over-correction of lateral chromatic aberration results.

To further improve the results, it is better to set forth the numerical limits for the inequalities of conditions (7) and (8) as follows:

$$-12 < \nu 11n - \nu 11p < 10 \qquad (7a)$$

$$18 < \nu 12n - \nu 12p < 32 \qquad (8a)$$

Figure 14:
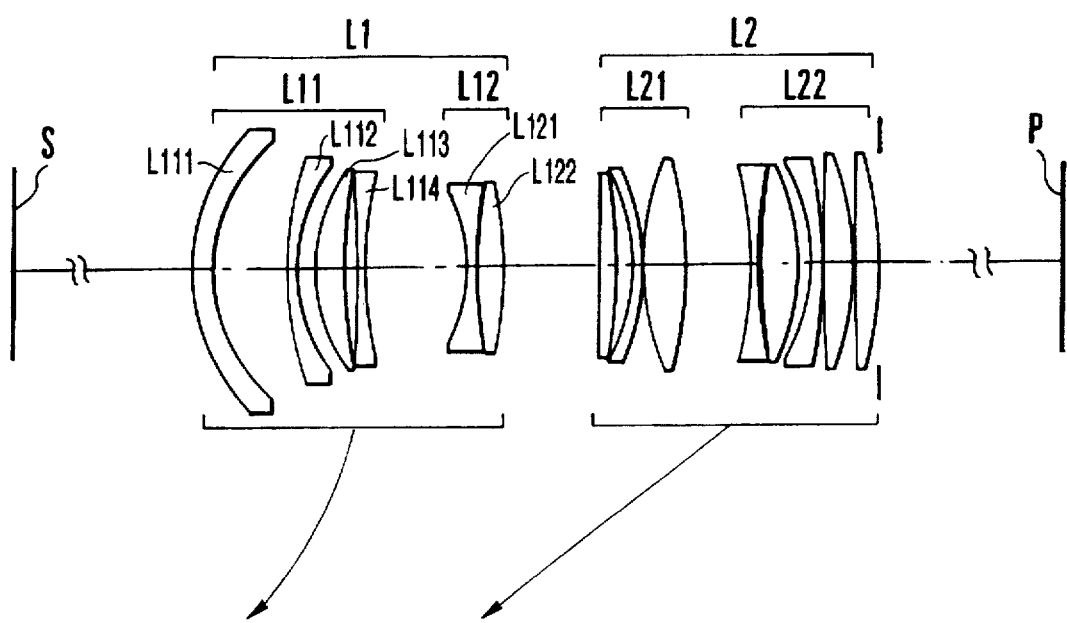
FIG. 14 is a lens block diagram of a numerical example 4 of the invention in the wide-angle end.
Figure 15:
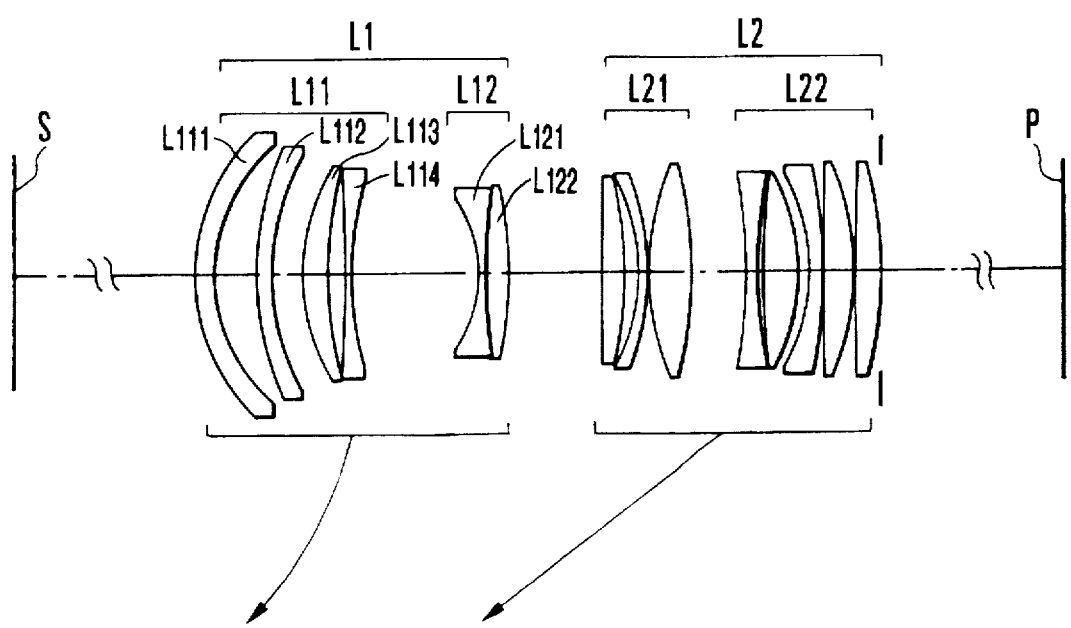
FIG. 15 is a lens block diagram of a numerical example 5 of the invention in the wide-angle end.

In the numerical examples 4 and 5 of zoom lenses shown in FIG. 14 and FIG. 15, the first front lens sub-unit L11 is constructed with four lenses, as comprising, in order from the first conjugate point, two negative lenses L111 and L112 of meniscus form convex toward the first conjugate point, a positive lens L113 having a strong refracting surface facing the first conjugate point and a negative lens L114 of bi-concave form.

Figure 16:
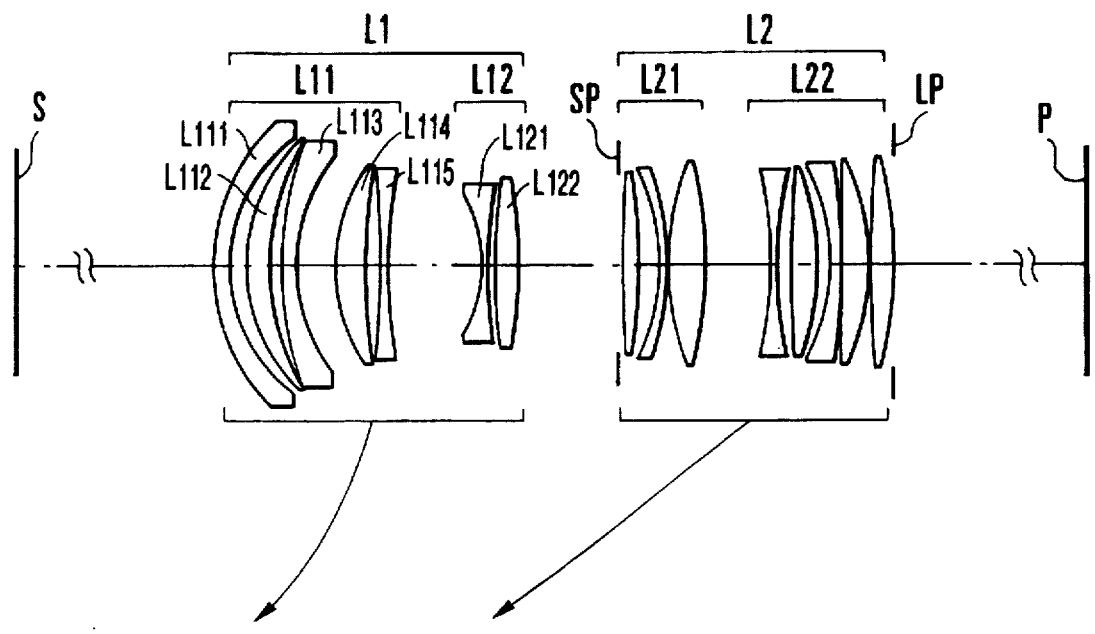
FIG. 16 is a lens block diagram of a numerical example 6 of the invention in the wide-angle end.

In another numerical example 6 of a zoom lens shown in FIG. 16, the first front lens sub-unit L11 is constructed with five lenses, as comprising, in order from the first conjugate point, a negative lens L111 of meniscus form convex toward the first conjugate point, a positive lens L112 of meniscus form convex toward the first conjugate point, a negative lens L113 of meniscus form convex toward the first conjugate point, a positive lens L114 having a strong refracting surface facing the first conjugate point and a negative lens L115 of bi-concave form.

Figure 17:
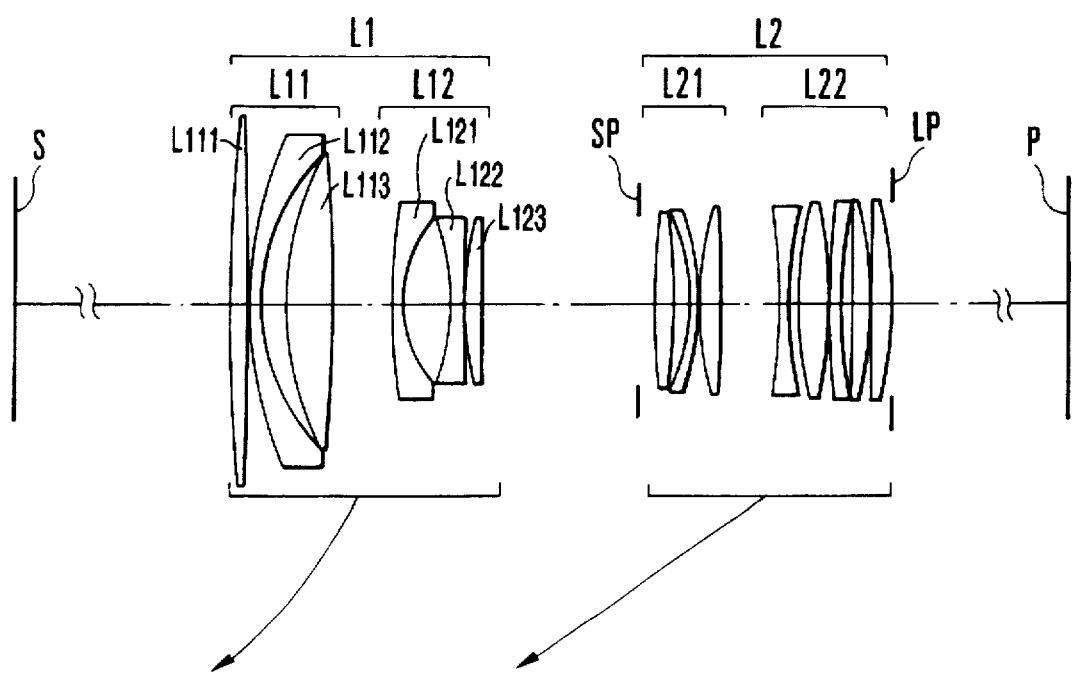
FIG. 17 is a lens block diagram of a numerical example 7 of the invention in the wide-angle end.
Figure 18:
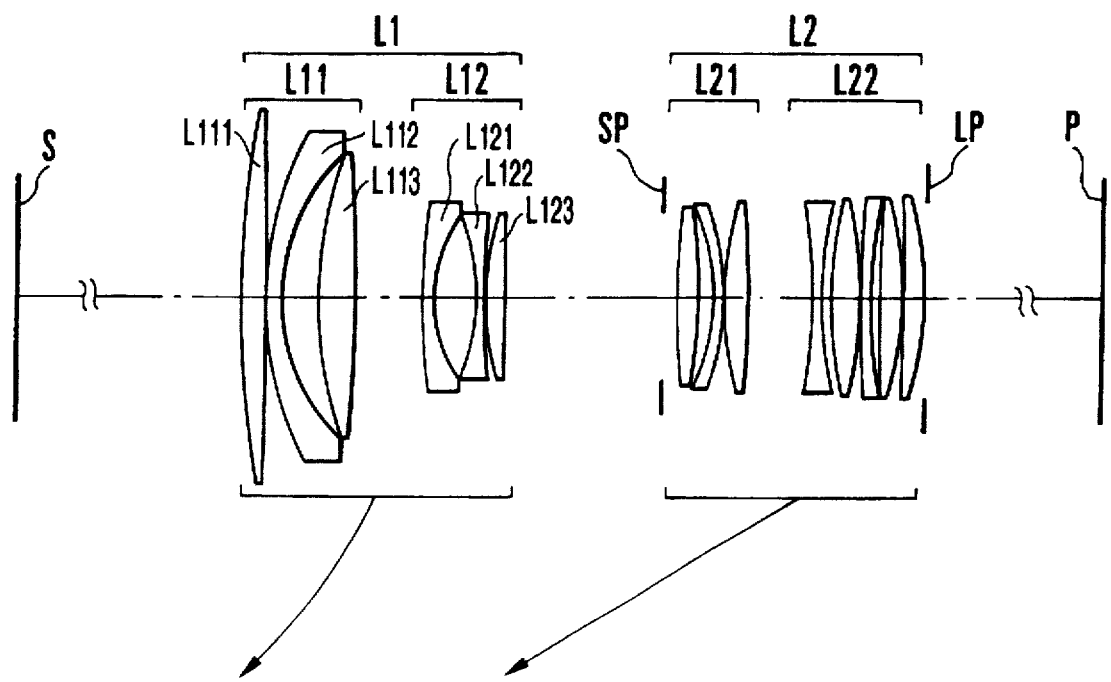
FIG. 18 is a lens block diagram of a numerical example 8 of the invention in the wide-angle end.

In other numerical examples 7 and 8 of zoom lenses shown in FIG. 17 and FIG. 18, the first front lens sub-unit L11 is constructed with three lenses, as comprising, in order from the first conjugate point, a positive lens L111 of bi-convex form, a negative lens L112 of meniscus form convex toward the first conjugate point and a positive lens L113 having a strong refracting surface facing the first conjugate point.

This leads to simultaneously fulfill the requirements of securing the back focal distance to a predetermined value and of well correcting the distortion of pincushion type that the negative lenses produce and other various aberrations.

Then, in the zoom lenses of FIG. 14, FIG. 15 and FIG. 16, the first rear lens sub-unit L12 is constructed with two lenses, as comprising, in order from the first conjugate point, a negative lens L121 of bi-concave form and a positive lens L122 of bi-convex form.

Particularly for the negative lens L121 and the positive lens L122, use is made of materials whose Abbe numbers differ from each other. Also, in the zoom lenses of FIG. 17 and FIG. 18, the first rear lens sub-unit L12 is constructed with three lenses, as comprising, in order from the first conjugate point, a negative lens L121 having a strong refracting surface facing the second conjugate point of a shorter distance, a negative lens L122 having a strong refracting surface facing the first conjugate point and a positive lens L123 having a strong refracting surface facing the first conjugate point. Particularly for the negative lenses, use is made of materials whose Abbe numbers are larger than the Abbe number of the material of the positive lens. This leads to correct well the variation of lateral and longitudinal chromatic aberrations and other various aberrations with zooming. A high optical performance is thus secured throughout the entire zooming range.

In particular, the first front lens sub-unit L11 is included with an aspheric surface of such shape that the negative refractive power gets progressively weaker as going from the center of the lens to the margin to thereby well correct distortion. The second lens unit L2 is also included with an aspheric surface of such shape that the positive refractive power gets progressively weaker as going from the center of the lens to the margin to thereby well correct spherical aberration.

For the zoom lens of the invention to further improve the stability of optical performance of the entire area of the image frame, it is recommended to satisfy at least one of the following features or conditions:

(i) The first front lens sub-unit L11 and the second lens unit L2 each have at least one aspheric surface. In particular, such an aspheric surface is applied to the one of the lens surfaces on which the off-axial principal ray is incident at a high height, thereby correcting distortion effectively throughout the entire zooming range.

(ii) The second rear lens sub-unit L22 has an aspheric surface of such shape that the positive refractive power gets progressively weaker as going from the center of the lens to the margin, thereby well correcting distortion and other various aberrations throughout the entire zooming range.

(iii) The second front lens sub-unit L21 is constructed with three lenses, as comprising, in order from the first conjugate point, a positive lens L211, a negative lens L212 of meniscus form convex toward the second conjugate point of a shorter distance and a positive lens L213, thereby correcting mainly spherical aberration and coma in good balance.

(iv) In the zoom lenses of FIG. 14, FIG. 15 and FIG. 16, the second rear lens sub-unit L22 is constructed with five lenses, as comprising, in order from the first conjugate point, a negative lens L221 of bi-concave form, a positive lens L222 of bi-convex form, a negative lens L223 having a surface of strong refracting power facing the first conjugate point, a positive lens L224 having a surface of strong refracting power facing the second conjugate point of a shorter distance, and a positive lens L225 of bi-convex form, thereby well correcting mainly spherical aberration and coma.

(v) In the zoom lenses of FIG. 17 and FIG. 18, the second rear lens sub-unit L22 is constructed with five lenses, as comprising, in order from the first conjugate point, a negative lens L221 of bi-concave form, a positive lens L222 of bi-convex form, a negative lens L223 of meniscus form convex toward the first conjugate point, and two positive lenses L224 and L225 having surfaces of strong refracting power facing the second conjugate point of a shorter distance, thereby well correcting mainly spherical aberration and coma.

It should be noted in connection with the zoom lenses of FIGS. 14 to 18 that, on aberration correction, it is more preferred to set forth the numerical limits for the inequalities of conditions (2) to (6) as follows:

$$1.6 < bfw/fw \quad (2b)$$

$$0.45 < -f1/f2 < 1.2 \quad (3b)$$

$$0.5 < -f1/fw < 1.5 \quad (4b)$$

$$0.7 < f2/fw < 1.5 \quad (5b)$$

$$0.7 < ew/fw < 1.6 \quad (6b)$$

Next, numerical examples 1 to 8 of the invention are shown. In the numerical data for the examples 1 to 8, Ri is the radius of curvature of the i-th lens surface, when counted from the screen, Di is the i-th axial lens thickness or air separation, when counted from the screen, and Ni and vi are respectively the refractive index and Abbe number of the material of the i-th lens element, when counted from the screen. The values of the factors in the above-described conditions (2) to (8) for the numerical examples 1 to 8 are listed in Table-1. The shape of an aspheric surface is expressed in the coordinates with an X-axis in the axial directions and an H-axis in the perpendicular direction to an optical axis, the direction in which light advances being taken as positive, by the following equation:

$$X = \frac{(1/R)H^2}{1 + \sqrt{1 - (1+K)(H/R)^2}} + A_2 H^4 + A_3 H^6 + A_4 H^8 + A_5 H^{10} + A_6 H^{12}$$

where R is the radius of the osculating sphere, and K, $A_2$, $A_3$, $A_4$, $A_5$ and $A_6$ are the aspheric coefficients.

Numerical Example 1:

f = 157.86  Fno = 1:4–4.5  2ω = 55.2°–46.4°

| | | | |
|---|---|---|---|
| R 1 = 143.89 | D 1 = 7.20 | N 1 = 1.62299 | v 1 = 58.2 |
| R 2 = 79.13 | D 2 = 13.38 | | |
| R 3 = 135.13 | D 3 = 15.05 | N 2 = 1.51633 | v 2 = 64.2 |
| R 4 = 1030.05 | D 4 = 9.99 | | |
| R 5 = 137.45 | D 5 = 6.00 | N 3 = 1.60311 | v 3 = 60.7 |
| R 6 = 60.03 | D 6 = 47.47 | | |
| R 7 = 274.48 | D 7 = 3.70 | N 4 = 1.60311 | v 4 = 60.7 |
| R 8 = 135.78 | D 8 = 15.06 | | |
| R 9 = –79.45 | D 9 = 3.50 | N 5 = 1.77250 | v 5 = 49.6 |
| R10 = –464.61 | D10 = 0.53 | | |
| R11 = 393.54 | D11 = 8.25 | N 6 = 1.67270 | v 6 = 32.1 |
| R12 = –131.56 | D12 = Variable | | |
| R13 = (Stop) | D13 = 1.00 | | |
| R14 = 236.75 | D14 = 11.00 | N 7 = 1.51823 | v 7 = 59.0 |
| R15 = –236.75 | D15 = 10.15 | | |
| R16 = –90.46 | D16 = 4.40 | N 8 = 1.78590 | v 8 = 44.2 |
| R17 = –131.01 | D17 = 18.81 | | |
| R18 = 256.50 | D18 = 15.05 | N 9 = 1.51823 | v 9 = 59.0 |
| R19 = –148.42 | D19 = 29.47 | | |
| R20 = –175.61 | D20 = 5.70 | N10 = 1.77250 | v10 = 49.6 |
| R21 = 175.61 | D21 = 2.75 | | |
| R22 = 170.60 | D22 = 12.65 | N11 = 1.49700 | v11 = 81.6 |
| R23 = –257.52 | D23 = 0.20 | | |
| R24 = –911.49 | D24 = 4.70 | N12 = 1.83400 | v12 = 37.2 |
| R25 = 236.68 | D25 = 1.48 | | |
| R26 = 356.29 | D26 = 9.75 | N13 = 1.49700 | v13 = 81.6 |
| R27 = –258.75 | D27 = 0.20 | | |
| R28 = 478.09 | D28 = 13.00 | N14 = 1.48749 | v14 = 70.2 |
| R29 = –150.00 | D29 = Variable | | |
| R30 = (Fixed Stop) | | | |

| Variable Separation | Focal Length | | |
|---|---|---|---|
| | 157.87 | 175.23 | 192.60 |
| D12 | 57.95 | 46.31 | 36.77 |
| D29 | 0.00 | 27.84 | 55.69 |

Aspheric Surface:

R5: K = 2.685  $A_2 = 1.253 \times 10^{-7}$  $A_3 = 1.606 \times 10^{-12}$
    $A_4 = 2.028 \times 10^{-15}$  $A_5 = 7.11 \times 10^{-19}$  $A_6 = 6.075 \times 10^{-23}$ R29: K = –7.655 × 10⁻¹  $A_2 = 4.285 \times 10^{-8}$  $A_3 = -5.103 \times 10^{-12}$
    $A_4 = 4.415 \times 10^{-15}$  $A_5 = -8.951 \times 10^{-19}$  $A_6 = 2.351 \times 10^{-23}$ Factor in Condition (1):
SF = 1.286

Numerical Example 2:

f = 156.82  Fno = 1:4–4.5  2ω = 55.4°–46.6°

| | | | |
|---|---|---|---|
| R 1 = 132.93 | D 1 = 6.30 | N 1 = 1.62299 | v 1 = 53.2 |
| R 2 = 81.45 | D 2 = 14.54 | | |
| R 3 = 174.66 | D 3 = 12.06 | N 2 = 1.51633 | v 2 = 64.2 |
| R 4 = 934.05 | D 4 = 4.55 | | |
| R 5 = 128.24 | D 5 = 5.10 | N 3 = 1.60311 | v 3 = 60.7 |
| R 6 = 60.09 | D 6 = 46.91 | | |
| R 7 = 100.12 | D 7 = 3.60 | N 4 = 1.77250 | v 4 = 49.6 |
| R 8 = 87.73 | D 8 = 14.30 | | |
| R 9 = –81.98 | D 9 = 3.50 | N 5 = 1.77250 | v 5 = 49.6 |
| R10 = 8812.25 | D10 = 1.04 | | |
| R11 = 267.89 | D11 = 9.60 | N 6 = 1.67270 | v 6 = 32.1 |
| R12 = –146.82 | D12 = Variable | | |
| R13 = (Stop) | D13 = 1.00 | | |
| R14 = 465.13 | D14 = 10.96 | N 7 = 1.51823 | v 7 = 59.0 |
| R15 = –190.31 | D15 = 5.94 | | |
| R16 = –87.21 | D16 = 4.40 | N 8 = 1.78590 | v 8 = 44.2 |
| R17 = –119.39 | D17 = 17.30 | | |
| R18 = 241.16 | D18 = 14.93 | N 9 = 1.51823 | v 9 = 59.0 |
| R19 = –169.98 | D19 = 38.03 | | |
| R20 = –186.42 | D20 = 4.59 | N10 = 1.77250 | v10 = 49.6 |
| R21 = 163.44 | D21 = 2.70 | | |
| R22 = 159.07 | D22 = 14.06 | N11 = 1.49700 | v11 = 81.6 |
| R23 = –190.03 | D23 = 0.20 | | |
| R24 = –2839.37 | D24 = 4.70 | N12 = 1.83400 | v12 = 37.2 |
| R25 = 227.93 | D25 = 1.46 | | |
| R26 = 324.34 | D26 = 3.86 | N13 = 1.49700 | v13 = 81.6 |
| R27 = –336.55 | D27 = 0.20 | | |

-continued

| | | | |
|---|---|---|---|
| R28 = 885.76 | D28 = 12.54 | N14 = 1.43749 | ν14 = 70.2 |
| R29 = −150.00 | D29 = Variable | | |
| R30 = (Fixed Stop) | | | |

| Variable | Focal Length | | |
|---|---|---|---|
| Separation | 156.83 | 174.08 | 191.33 |
| D12 | 62.19 | 50.60 | 41.09 |
| D29 | 0.00 | 28.05 | 56.11 |

Aspheric Surface:

R5: $K = 2.811$ $A_2 = 1.002 \times 10^{-7}$ $A_3 = -2.426 \times 10^{-11}$
$A_4 = 7.291 \times 10^{-15}$ $A_5 = -5.053 \times 10^{-19}$ $A_6 = -3.168 \times 10^{-22}$
R29: $K = -5.516 \times 10^{-1}$ $A_2 = 2.862 \times 10^{-8}$ $A_3 = -3.136 \times 10^{-12}$
$A_4 = 2.349 \times 10^{-15}$ $A_5 = -1.067 \times 10^{-19}$ $A_6 = 8.094 \times 10^{-23}$ Factor in Condition (1):
SF = 1.460

Numerical Example 3:

| | | | |
|---|---|---|---|
| f = 141.95 | Fno = 1:4–4.5 | 2ω = 60.4°–51° | |
| R 1 = 201.69 | D 1 = 6.80 | N 1 = 1.62299 | ν 1 = 58.2 |
| R 2 = 79.92 | D 2 = 15.24 | | |
| R 3 = 171.74 | D 3 = 14.53 | N 2 = 1.51633 | ν 2 = 64.2 |
| R 4 = −934.47 | D 4 = 0.40 | | |
| R 5 = 126.47 | D 5 = 5.10 | N 3 = 1.60311 | ν 3 = 60.7 |
| R 6 = 62.81 | D 6 = 49.35 | | |
| R 7 = 83.12 | D 7 = 3.60 | N 4 = 1.77250 | ν 4 = 49.6 |
| R 8 = 66.06 | D 8 = 14.23 | | |
| R 9 = −90.81 | D 9 = 3.50 | N 5 = 1.77250 | ν 5 = 49.6 |
| R10 = 827.34 | D10 = 0.20 | | |
| R11 = 166.18 | D11 = 9.76 | N 6 = 1.67270 | ν 6 = 32.1 |
| R12 = −156.38 | D12 = Variable | | |
| R13 = (Stop) | D13 = 1.00 | | |
| R14 = 765.37 | D14 = 9.72 | N 7 = 1.51823 | ν 7 = 59.0 |
| R15 = −161.69 | D15 = 9.37 | | |
| R16 = −84.25 | D16 = 4.40 | N 8 = 1.77250 | ν 8 = 49.6 |
| R17 = −125.28 | D17 = 13.05 | | |
| R18 = 249.53 | D18 = 13.53 | N 9 = 1.51823 | ν 9 = 59.0 |
| R19 = −165.04 | D19 = 37.33 | | |
| R20 = −194.33 | D20 = 4.60 | N10 = 1.77250 | ν10 = 49.6 |
| R21 = 162.90 | D21 = 2.57 | | |
| R22 = 156.16 | D22 = 14.04 | N11 = 1.49700 | ν11 = 81.6 |
| R23 = −189.05 | D23 = 0.20 | | |
| R24 = −3750.64 | D24 = 4.70 | N12 = 1.83400 | ν12 = 37.2 |
| R25 = 220.84 | D25 = 1.07 | | |
| R26 = 275.71 | D26 = 11.76 | N13 = 1.49700 | ν13 = 81.6 |
| R27 = −200.72 | D27 = 0.20 | | |
| R28 = −1000.88 | D28 = 10.31 | N14 = 1.48749 | ν14 = 70.2 |
| R29 = −150.00 | D29 = Variable | | |
| R30 = (Fixed Stop) | | | |

| Variable | Focal Length | | |
|---|---|---|---|
| Separation | 141.96 | 157.57 | 173.19 |
| D12 | 68.12 | 55.62 | 45.37 |
| D29 | 0.00 | 26.78 | 53.56 |

Aspheric Surface:

R5: $K = 2.554$ $A_2 = 7.650 \times 10^{-8}$ $A_3 = -2.919 \times 10^{-11}$
$A_4 = 9.951 \times 10^{-15}$ $A_5 = -7.035 \times 10^{-19}$ $A_6 = -1.578 \times 10^{-22}$
R29: $K = -3.734 \times 10^{-1}$ $A_2 = 2.910 \times 10^{-8}$ $A_3 = -3.501 \times 10^{-12}$
$A_4 = 3.573 \times 10^{-15}$ $A_5 = -7.709 \times 10^{-19}$ $A_6 = 5.460 \times 10^{-23}$

Numerical Example 4:

| | | | |
|---|---|---|---|
| f = 108.80 | Fno = 1:3.6–4.5 | 2ω = 45°–30.8° | |
| R 1 = 71.79 | D 1 = 5.00 | N 1 = 1.51633 | ν 1 = 64.2 |
| R 2 = 49.50 | D 2 = 20.57 | | |
| R 3 = 94.29 | D 3 = 3.70 | N 2 = 1.51633 | ν 2 = 64.2 |
| R 4 = 53.24 | D 4 = 5.20 | | |
| R 5 = 51.82 | D 5 = 8.10 | N 3 = 1.51633 | ν 3 = 64.2 |
| R 6 = 156.15 | D 6 = 3.15 | | |
| R 7 = −566.78 | D 7 = 2.35 | N 4 = 1.51633 | ν 4 = 64.2 |
| R 8 = 114.71 | D 8 = 28.86 | | |
| R 9 = −44.22 | D 9 = 2.30 | N 5 = 1.60311 | ν 5 = 60.7 |
| R10 = 130.11 | D10 = 0.27 | | |
| R11 = 147.84 | D11 = 6.70 | N 6 = 1.83400 | ν 6 = 37.2 |
| R12 = −129.68 | D12 = Variable | | |
| R13 = 2232.65 | D13 = 5.25 | N 7 = 1.51633 | ν 7 = 64.2 |
| R14 = −156.23 | D14 = 4.53 | | |
| R15 = −54.55 | D15 = 2.70 | N 8 = 1.62299 | ν 8 = 58.2 |
| R16 = −74.79 | D16 = 0.20 | | |
| R17 = 74.79 | D17 = 12.40 | N 9 = 1.48749 | ν 9 = 70.2 |
| R18 = −118.72 | D18 = 18.44 | | |
| R19 = −104.94 | D19 = 2.30 | N10 = 1.78590 | ν10 = 44.2 |
| R20 = 142.25 | D20 = 1.21 | | |
| R21 = 253.00 | D21 = 9.50 | N11 = 1.48749 | ν11 = 70.2 |
| R22 = −66.51 | D22 = 3.39 | | |
| R23 = −58.58 | D23 = 2.90 | N12 = 1.78590 | ν12 = 44.2 |
| R24 = −158.79 | D24 = 0.20 | | |
| R25 = 774.64 | D25 = 8.70 | N13 = 1.49700 | ν13 = 81.6 |
| R26 = −81.74 | D26 = 0.20 | | |
| R27 = 800.46 | D27 = 7.05 | N14 = 1.48749 | ν14 = 70.2 |
| R28 = −110.00 | D28 = Variable | | |
| R29 = Fixed Stop | | | |

| Variable | Focal Length | | |
|---|---|---|---|
| Separation | 108.80 | 136.10 | 163.40 |
| D12 | 27.91 | 13.18 | 3.37 |
| D28 | 0.00 | 34.39 | 68.79 |

Aspheric Surface:

R1: $R = 7.179 \, D + 01$ $K = 8.253 \, D - 01$ $A_2 = 2.505 \, D - 07$
$A_3 = 4.381 \, D - 12$ $A_4 = 8.135 \, D - 14$ $A_5 = -4.999 \, D - 17$
$A_6 = 1.856 \, D - 20$
R28: $R = -1.100 \, D + 02$ $K = -6.804 \, D - 01$ $A_2 = 5.320 \, D - 07$
$A_3 = 2.211 \, D - 10$ $A_4 = -2.379 \, D - 13$ $A_5 = 1.987 \, D - 16$
$A_6 = -5.833 \, D - 20$

Numerical Example 5:

| | | | |
|---|---|---|---|
| f = 108.61 | Fno = 1:3.6–4.5 | 2ω = 45°–30.8° | |
| R 1 = 67.00 | D 1 = 5.00 | N 1 = 1.51633 | ν 1 = 64.2 |
| R 2 = 47.64 | D 2 = 12.65 | | |
| R 3 = 91.73 | D 3 = 3.70 | N 2 = 1.51633 | ν 2 = 64.2 |
| R 4 = 68.01 | D 4 = 8.77 | | |
| R 5 = 55.84 | D 5 = 7.68 | N 3 = 1.51633 | ν 3 = 64.2 |
| R 6 = 128.14 | D 6 = 4.24 | | |
| R 7 = −537.03 | D 7 = 2.00 | N 4 = 1.51633 | ν 4 = 64.2 |
| R 8 = 91.96 | D 8 = 34.82 | | |
| R 9 = −42.11 | D 9 = 2.30 | N 5 = 1.60311 | ν 5 = 60.7 |
| R10 = 142.93 | D10 = 0.28 | | |
| R11 = 162.10 | D11 = 6.69 | N 6 = 1.83400 | ν 6 = 37.2 |
| R12 = −119.41 | D12 = Variable | | |
| R13 = (Stop) | D13 = 0.00 | | |
| R14 = 1113.64 | D14 = 6.36 | N 7 = 1.51633 | ν 7 = 64.2 |
| R15 = −127.45 | D15 = 3.86 | | |
| R16 = −56.05 | D16 = 2.70 | N 8 = 1.72000 | ν 8 = 50.3 |
| R17 = −81.29 | D17 = 0.19 | | |
| R18 = 75.45 | D18 = 12.47 | N 9 = 1.51633 | ν 9 = 64.2 |
| R19 = −121.02 | D19 = 15.51 | | |
| R20 = −143.50 | D20 = 2.69 | N10 = 1.78590 | ν10 = 44.2 |
| R21 = 124.51 | D21 = 1.73 | | |
| R22 = 283.43 | D22 = 9.09 | N11 = 1.48749 | ν11 = 70.2 |
| R23 = −68.97 | D23 = 4.03 | | |
| R24 = −55.56 | D24 = 2.90 | N12 = 1.80610 | ν12 = 41.0 |
| R25 = −173.15 | D25 = 0.20 | | |
| R26 = 1334.20 | D26 = 9.03 | N13 = 1.48749 | ν13 = 70.2 |
| R27 = −75.61 | D27 = 0.20 | | |
| R28 = 837.60 | D28 = 7.38 | N14 = 1.48749 | ν14 = 70.2 |
| R29 = −104.92 | D29 = Variable | | |
| R30 = Fixed Stop | | | |

| Variable | Focal Length | | |
|---|---|---|---|
| Separation | 108.61 | 135.76 | 162.92 |
| D12 | 27.16 | 13.01 | 3.57 |
| D29 | 0.00 | 34.45 | 68.90 |

Aspheric Surface

R1: $R = 6.700 \, D+01$   $K = 8.503 \, D-01$   $A_2 = 1.912 \, D-07$
   $A_3 = -3.255 \, D-14$   $A_4 = 6.410 \, D-14$   $A_5 = -4.410 \, D-17$
   $A_6 = 1.665 \, D-20$

R29: $R = -1.049 \, D+02$   $K = -2.264 \, D-01$   $A_2 = 5.806 \, D-07$
   $A_3 = 2.177 \, D-10$   $A_4 = -1.886 \, D-13$   $A_5 = 1.482 \, D-16$
   $A_6 = -3.475 \, D-20$

Numerical Example 6:

$f = 107.98$   $Fno = 1:3.6-4.5$   $2\omega = 45.2°-31°$

| | | | |
|---|---|---|---|
| R 1 = 64.45 | D 1 = 5.00 | N 1 = 1.60311 | ν 1 = 60.7 |
| R 2 = 45.98 | D 2 = 5.56 | | |
| R 3 = 52.55 | D 3 = 5.84 | N 2 = 1.51633 | ν 2 = 64.2 |
| R 4 = 68.69 | D 4 = 2.99 | | |
| R 5 = 96.15 | D 5 = 3.50 | N 3 = 1.60311 | ν 3 = 60.7 |
| R 6 = 47.69 | D 6 = 11.78 | | |
| R 7 = 50.20 | D 7 = 8.00 | N 4 = 1.51633 | ν 4 = 64.2 |
| R 8 = 169.18 | D 8 = 4.28 | | |
| R 9 = -335.38 | D 9 = 2.00 | N 5 = 1.60311 | ν 5 = 60.7 |
| R10 = 134.11 | D10 = 26.27 | | |
| R11 = -43.63 | D11 = 2.00 | N 6 = 1.60311 | ν 6 = 60.7 |
| R12 = 145.86 | D12 = 1.94 | | |
| R13 = 200.15 | D13 = 6.68 | N 7 = 1.83400 | ν 7 = 37.2 |
| R14 = -118.67 | D14 = Variable | | |
| R15 = (Stop) | D15 = 0.54 | | |
| R16 = 342.95 | D16 = 4.70 | N 8 = 1.51633 | ν 8 = 64.2 |
| R17 = -166.09 | D17 = 5.76 | | |
| R18 = -58.80 | D18 = 2.50 | N 9 = 1.77250 | ν 9 = 49.6 |
| R19 = -82.90 | D19 = 0.12 | | |
| R20 = 77.27 | D20 = 10.76 | N10 = 1.51633 | ν10 = 64.2 |
| R21 = -117.30 | D21 = 17.65 | | |
| R22 = -119.91 | D22 = 2.33 | N11 = 1.78590 | ν11 = 44.2 |
| R23 = 135.29 | D23 = 3.13 | | |
| R24 = 306.18 | D24 = 7.63 | N12 = 1.48749 | ν12 = 70.2 |
| R25 = -76.20 | D25 = 3.46 | | |
| R26 = -59.14 | D26 = 2.80 | N13 = 1.80610 | ν13 = 41.0 |
| R27 = -211.59 | D27 = 0.20 | | |
| R28 = 2391.07 | D28 = 7.89 | N14 = 1.48749 | ν14 = 70.2 |
| R29 = -69.64 | D29 = 0.20 | | |
| R30 = 342.89 | D30 = 6.50 | N15 = 1.48749 | ν15 = 70.2 |
| R31 = -110.00 | D31 = Variable | | |
| R32 = Fixed Stop | | | |

| Variable | Focal Length | | |
|---|---|---|---|
| Separation | 107.98 | 134.98 | 161.97 |
| D14 | 27.57 | 12.72 | 2.83 |
| D31 | 0.00 | 32.94 | 65.88 |

Aspheric Surface:

R1: $R = 6.445 \, D+01$   $K = 7.311 \, D-01$   $A_2 = 1.539 \, D-07$
   $A_3 = 3.127 \, D-11$   $A_4 = 2.531 \, D-14$   $A_5 = -2.369 \, D-17$
   $A_6 = 1.169 \, D-20$

R31: $R = -1.100 \, D+02$   $K = -5.454 \, D-01$   $A_2 = 6.294 \, D-07$
   $A_3 = 1.650 \, D-10$   $A_4 = -1.052 \, D-13$   $A_5 = 8.892 \, D-17$
   $A_6 = -2.415 \, D-20$

Numerical Example 7:

$f = 109.15$   $Fno = 1:3.6-4.5$   $2\omega = 44.8°-30.8°$

| | | | |
|---|---|---|---|
| R 1 = 536.79 | D 1 = 5.12 | N 1 = 1.51633 | ν 1 = 64.2 |
| R 2 = -1536.51 | D 2 = 0.20 | | |
| R 3 = 117.25 | D 3 = 4.50 | N 2 = 1.60311 | ν 2 = 60.7 |
| R 4 = 61.61 | D 4 = 5.95 | | |
| R 5 = 90.81 | D 5 = 13.18 | N 3 = 1.51633 | ν 3 = 64.2 |
| R 6 = -427.89 | D 6 = 16.68 | | |
| R 7 = 207.06 | D 7 = 3.00 | N 4 = 1.60311 | ν 4 = 60.7 |
| R 8 = 36.39 | D 8 = 13.51 | | |
| R 9 = -59.95 | D 9 = 2.80 | N 5 = 1.60311 | ν 5 = 60.7 |
| R10 = 320.32 | D10 = 0.20 | | |
| R11 = 83.62 | D11 = 4.96 | N 6 = 1.83400 | ν 6 = 37.2 |
| R12 = 2522.71 | D12 = Variable | | |
| R13 = (Stop) | D13 = 4.30 | | |
| R14 = 273.13 | D14 = 5.46 | N 7 = 1.69680 | ν 7 = 55.5 |
| R15 = -202.55 | D15 = 3.87 | | |
| R16 = -59.08 | D16 = 3.00 | N 8 = 1.78590 | ν 8 = 44.2 |
| R17 = -75.05 | D17 = 0.52 | | |
| R18 = 114.91 | D18 = 5.53 | N 9 = 1.51823 | ν 9 = 59.0 |
| R19 = -436.85 | D19 = 15.77 | | |
| R20 = -161.30 | D20 = 2.97 | N10 = 1.80610 | ν10 = 41.0 |
| R21 = 109.11 | D21 = 2.02 | | |
| R22 = 106.68 | D22 = 8.62 | N11 = 1.49700 | ν11 = 81.6 |
| R23 = -133.59 | D23 = 0.20 | | |
| R24 = 287.05 | D24 = 2.97 | N12 = 1.83400 | ν12 = 37.2 |
| R25 = 128.21 | D25 = 3.40 | | |
| R26 = -3067.63 | D26 = 5.65 | N13 = 1.51633 | ν13 = 64.2 |
| R27 = -93.98 | D27 = 0.13 | | |
| R28 = -845.75 | D28 = 5.64 | N14 = 1.51633 | ν14 = 64.2 |
| R29 = -102.21 | D29 = Variable | | |
| R30 = Fixed Stop | | | |

| Variable | Focal Length | | |
|---|---|---|---|
| Separation | 109.16 | 136.45 | 163.74 |
| D12 | 43.99 | 15.58 | 26.95 |
| D29 | 0.00 | 57.59 | 28.79 |

Aspheric Surface:

R5: $R = 9.081 \, D+01$   $K = -9.936 \, D-02$   $A_2 = 8.342 \, D-09$
   $A_3 = -1.715 \, D-11$   $A_4 = -1.296 \, D-15$   $A_5 = -3.102 \, D-19$

R18: $R = 1.149 \, D+02$   $K = -2.984 \, D+00$   $A_2 = 8.658 \, D-08$
   $A_3 = 1.153 \, D-11$   $A_4 = 4.377 \, D-15$   $A_5 = -3.353 \, D-18$

Numerical Example 8:

$f = 108.72$   $Fno = 1:3.6-4.5$   $2\omega = 45°-30.8°$

| | | | |
|---|---|---|---|
| R 1 = 310.26 | D 1 = 6.23 | N 1 = 1.51633 | ν 1 = 64.2 |
| R 2 = -5026.20 | D 2 = 0.20 | | |
| R 3 = 104.05 | D 3 = 4.50 | N 2 = 1.60311 | ν 2 = 60.7 |
| R 4 = 54.60 | D 4 = 9.02 | | |
| R 5 = 107.96 | D 5 = 10.58 | N 3 = 1.51633 | ν 3 = 64.2 |
| R 6 = -477.51 | D 6 = 18.50 | | |
| R 7 = 193.30 | D 7 = 3.00 | N 4 = 1.60311 | ν 4 = 60.7 |
| R 8 = 38.86 | D 8 = 11.63 | | |
| R 9 = -61.77 | D 9 = 2.80 | N 5 = 1.60311 | ν 5 = 60.7 |
| R10 = 223.90 | D10 = 0.20 | | |
| R11 = 82.79 | D11 = 5.11 | N 6 = 1.83400 | ν 6 = 37.2 |
| R12 = -3717.41 | D12 = Variable | | |
| R13 = (Stop) | D13 = 4.11 | | |
| R14 = 284.69 | D14 = 5.74 | N 7 = 1.69680 | ν 7 = 55.5 |
| R15 = -165.89 | D15 = 3.47 | | |
| R16 = -59.23 | D16 = 3.00 | N 8 = 1.78590 | ν 8 = 44.2 |
| R17 = -80.13 | D17 = 0.52 | | |
| R18 = 117.58 | D18 = 5.56 | N 9 = 1.51823 | ν 9 = 59.0 |
| R19 = -445.97 | D19 = 16.97 | | |
| R20 = -161.61 | D20 = 2.97 | N10 = 1.80610 | ν10 = 41.0 |
| R21 = 104.10 | D21 = 2.12 | | |
| R22 = 107.88 | D22 = 7.81 | N11 = 1.49700 | ν11 = 81.6 |
| R23 = -140.97 | D23 = 0.20 | | |
| R24 = 276.79 | D24 = 2.97 | N12 = 1.83400 | ν12 = 37.2 |
| R25 = 131.43 | D25 = 2.66 | | |
| R26 = 1419.51 | D26 = 5.87 | N13 = 1.51633 | ν13 = 64.2 |
| R27 = -97.28 | D27 = 0.16 | | |
| R28 = -1325.52 | D28 = 5.80 | N14 = 1.51633 | ν14 = 64.2 |
| R29 = -104.08 | D29 = Variable | | |
| R30 = Fixed Stop | | | |

| Variable | Focal Length | | |
|---|---|---|---|
| Separation | 108.73 | 135.91 | 163.09 |
| D12 | 42.38 | 25.53 | 14.30 |
| D29 | 0.00 | 28.95 | 57.91 |

TABLE 1

| Condition | Numerical Example | | | |
|---|---|---|---|---|
| No. | 1 | 2 | 3 | 4 |
| (2) | 2.236 | 2.264 | 2.485 | 1.849 |
| (3) | 0.624 | 0.615 | 0.583 | 0.790 |
| (4) | 0.681 | 0.677 | 0.720 | 0.730 |
| (5) | 1.092 | 1.101 | 1.235 | 0.924 |
| (6) | 1.155 | 1.170 | 1.404 | 0.869 |
| (7) | −4.75 | −4.75 | −4.75 | 0 |
| (8) | 23.05 | 17.5 | 17.5 | 23.5 |

| Condition | Numerical Example | | | |
|---|---|---|---|---|
| No. | 5 | 6 | 7 | 8 |
| (2) | 1.838 | 1.743 | 1.719 | 1.73 |
| (3) | 0.788 | 0.862 | 0.947 | 0.94 |
| (4) | 0.716 | 0.786 | 0.860 | 0.83 |
| (5) | 0.910 | 0.913 | 0.908 | 0.91 |
| (6) | 0.845 | 0.844 | 0.829 | 0.83 |
| (7) | 0 | −3.5 | −3.5 | −3.5 |
| (8) | 23.5 | 23.5 | 23.5 | 23.5 |

According to the invention, as described above, the entire system is constructed by using two lens units, and the proper rules of design are set forth for the construction and arrangement of the constituent lenses of each lens unit. With these, it is made possible to achieve a zoom lens of widened angle of image projection with the variation of aberrations with zooming corrected well, particularly with distortion well corrected, to maintain good stability of optical performance throughout the entire zooming range, while still permitting a long back focal distance to be obtained with ease, which zoom lens is suited to be used in, for example, the liquid crystal projector.

What is claimed is:

1. A zoom lens comprising, in order from a first conjugate point of a longer distance to a second conjugate point of a shorter distance:

a first lens unit of negative refractive power, said first lens unit including a first front lens sub-unit having at least one positive lens and at least one negative lens and, after a largest air separation in said first lens unit, a first rear lens sub-unit having at least one positive lens and at least one negative lens; and a second lens unit of positive refractive power, said second lens unit including a second front lens sub-unit having at least one positive lens and at least one negative lens and, after a largest air separation in said second lens unit, a second rear lens sub-unit having at least one positive lens and at least one negative lens, wherein zooming is performed by varying a separation between said first lens unit and said second lens unit, wherein both in said first lens unit and in said second lens unit, the air space between the lenses constituting the lens units is constant, and said first front lens sub-unit and said second lens unit each have at least one aspheric surface, and wherein said first front lens sub-unit comprises, in order from the first conjugate point, a negative lens of meniscus form convex toward the first conjugate point, a positive lens having a convex surface of strong refractive power facing the first conjugate point, and a negative lens of meniscus form convex toward the first conjugate point.

2. A zoom lens according to claim 1, wherein said first rear lens sub-unit comprises a negative lens of meniscus form convex toward the first conjugate point, a negative lens having a surface of strong refracting power facing the first conjugate point and a positive lens, said second front lens sub-unit comprises a positive lens of bi-convex form, a negative lens having a surface of strong refracting power facing the first conjugate point and a positive lens of bi-convex form, and said second rear lens sub-unit comprises a negative lens of bi-concave form, a positive lens of bi-convex form, a negative lens having a concave surface of strong refractive power facing the second conjugate point, a positive lens of bi-convex form and a positive lens having a convex surface of strong refractive power facing the second conjugate point.

3. A zoom lens comprising, in order from a first conjugate point of a longer distance to a second conjugate point of a shorter distance:

a first lens unit of negative refractive power, said first lens unit including a first front lens sub-unit having at least one positive lens and at least one negative lens and, after a largest air separation in said first lens unit, a first rear lens sub-unit having at least one positive lens and at least one negative lens; and a second lens unit of positive refractive power, said second lens unit including a second front lens sub-unit having at least one positive lens and at least one negative lens and, after a largest air separation in said second lens unit, a second rear lens sub-unit having at least one positive lens and at least one negative lens.

wherein zooming is performed by varying a separation between said first lens unit and said second lens unit, wherein both in said first lens unit and in said second lens unit, the air space between the lenses constituting the lens units is constant, and said first front lens sub-unit and said second lens unit each have at least one aspheric surface, and wherein said first front lens sub-unit comprises two negative lenses of meniscus form convex toward the first conjugate point, a positive lens having a surface of strong refracting power facing the first conjugate point, and a negative lens of bi-concave form.

4. A zoom lens comprising, in order from a first conjugate point of a longer distance to a second conjugate point of a shorter distance:

a first lens unit of negative refractive power, said first lens unit including a first front lens sub-unit having at least one positive lens and at least one negative lens and, after a largest air separation in said first lens unit, a first rear lens sub-unit having at least one positive lens and at least one negative lens; and a second lens unit of positive refractive power, said second lens unit including a second front lens sub-unit having at least one positive lens and at least one negative lens and after a largest air separation in said second lens unit, a second rear lens sub-unit having at least one positive lens and at least one negative lens.

wherein zooming is performed by varying a separation between said first lens unit and said second lens unit, and wherein said first front lens sub-unit comprises, in order from the first conjugate point, a negative meniscus lens convex toward the first conjugate point, a positive meniscus lens convex toward the first conjugate point, a negative meniscus lens convex toward the first conjugate point, a positive lens having a surface of strong refracting power facing the first conjugate point and a bi-concave negative lens.

5. A zoom lens comprising, in order from a first conjugate point of a longer distance to a second conjugate point of a shorter distance:

a first lens unit of negative refractive power, said first lens unit including a first front lens sub-unit having at least one positive lens and at least one negative lens and, after a largest air separation in said first lens unit, a first rear lens sub-unit having at least one positive lens and at least one negative lens; and a second lens unit of positive refractive power, said second lens unit including a second front lens sub-unit having at least one positive lens and at least one negative lens and, after a largest air separation in said second lens unit, a second rear lens sub-unit having at least one positive lens and at least one negative lens, wherein zooming is performed by varying a separation between said first lens unit and said second lens unit, wherein both in said first lens unit and in said second lens unit, the air space between the lenses constituting the lens units is constant, and said first front lens sub-unit and said second lens unit each have at least one aspheric surface, and wherein said first front lens sub-unit comprises, in order from the first conjugate point, a bi-convex lens, a negative meniscus lens convex toward the first conjugate point, and a positive lens having a surface of strong refracting power facing the first conjugate point.

6. A zoom lens according to claim 4, wherein said first front lens sub-unit and said second lens unit each have at least one aspheric surface.

7. A zoom lens according to any one of claims 1 to 5, satisfying the following conditions:

$$-15 < v_{11n} - v_{11p} < 15$$

$$15 < v_{12n} - v_{12p} < 40$$

where $v_{11n}$: a mean value of the Abbe numbers of negative lenses in said first front lens sub-unit;

$v_{11p}$: a mean value of the Abbe numbers of positive lenses in said first front lens sub-unit;

$v_{12n}$: a mean value of the Abbe numbers of negative lenses in said first rear lens sub-unit; and $v_{12p}$: a mean value of the Abbe numbers of positive lenses in said first rear lens sub-unit.

8. A zoom lens comprising, in order from a first conjugate point of a longer distance to a second conjugate point of a shorter distance:

a first lens unit of negative refractive power, said first lens unit including a first front lens sub-unit having at least one positive lens and at least one negative lens and, after a largest air separation in said first lens unit, a first rear lens sub-unit having at least one positive lens and at least one negative lens; and a second lens unit of positive refractive power, said second lens unit including a second front lens sub-unit having at least one positive lens and at least one negative lens and, after a largest air separation in said second lens unit, a second rear lens sub-unit having at least one positive lens and at least one negative lens, wherein zooming is performed by varying a separation between said first lens unit and said second lens unit, said zoom lens satisfying the following condition:

$$-15 < v_{11n} - v_{11p} < 15$$

$$15 < v_{12n} - v_{12p} < 40$$

where $v_{11n}$: a mean value of the Abbe numbers of negative lenses in said first front lens sub-unit;

$v_{11p}$: a mean value of the Abbe numbers of positive lenses in said first front lens sub-unit;

$v_{12n}$: a mean value of the Abbe numbers of negative lenses in said first rear lens sub-unit; and $v_{12p}$: a mean value of the Abbe numbers of positive lenses in said first rear lens sub-unit and wherein said first front lens sub-unit and said second lens unit each have at least one aspheric surface, and wherein no lens unit is present between said first lens unit and said second lens unit.

* * * * *

UNITED STATES PATENT AND TRADEMARK OFFICE
CERTIFICATE OF CORRECTION

PATENT NO. : 5,781,349

DATED : July 14, 1998

INVENTOR(S) : SABURO SUGAWARA

Page 1 of 2

It is certified that error appears in the above-identified patent and that said Letters Patent is hereby corrected as shown below:

COLUMN 3:

line 67, "and 8D." should read --and 8D, and--.

COLUMN 4:

Line 4, "and 10D" should read --and 10D,--.

COLUMN 6:

Line 6, "So" should read --So,--.

COLUMN 11:

Line 15, "$A_6 = 8.094 \times 10^{-23}$" should read --$A_6 = -8.094 \times 10^{23}$--.

COLUMN 16:

Line 53, "and after" should read --and, after--.

UNITED STATES PATENT AND TRADEMARK OFFICE
CERTIFICATE OF CORRECTION

PATENT NO. : 5,781,349

DATED : July 14, 1998

INVENTOR(S) : SABURO SUGAWARA

It is certified that error appears in the above-identified patent and that said Letters Patent is hereby corrected as shown below:

COLUMN 18:

Line 36, "rear lens sub-unit" should read --rear lens sub-unit,--.

Signed and Sealed this

Nineteenth Day of October, 1999

Attest:

Q. TODD DICKINSON

Attesting Officer

Acting Commissioner of Patents and Trademarks